(12) United States Patent
Futaki

(10) Patent No.: US 12,022,345 B2
(45) Date of Patent: *Jun. 25, 2024

(54) MACHINE-TO-MACHINE (M2M) TERMINAL, BASE STATION, METHOD, AND COMPUTER READABLE MEDIUM

(71) Applicant: NEC Corporation, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,355

(22) Filed: Oct. 8, 2021

(65) Prior Publication Data
US 2022/0030490 A1 Jan. 27, 2022

Related U.S. Application Data

(63) Continuation of application No. 16/934,688, filed on Jul. 21, 2020, now Pat. No. 11,166,214, which is a
(Continued)

(30) Foreign Application Priority Data

Jan. 30, 2014 (JP) ................................ 2014-015867

(51) Int. Cl.
*H04W 36/08* (2009.01)
*H04L 12/16* (2006.01)
(Continued)

(52) U.S. Cl.
CPC ............ *H04W 36/08* (2013.01); *H04L 12/16* (2013.01); *H04L 12/189* (2013.01); *H04W 4/06* (2013.01);
(Continued)

(58) Field of Classification Search
CPC ........ H04W 36/00; H04W 36/08; H04W 4/00
See application file for complete search history.

(56) References Cited

U.S. PATENT DOCUMENTS 8,929,339 B2   1/2015 Park et al.
2002/0032032 A1*  3/2002 Haumont .............. H04W 36/38
                                                           455/445
(Continued)

FOREIGN PATENT DOCUMENTS

CN   102318232 A   1/2012
CN   103120004 A   5/2013
EP   2640152 A2    9/2013

OTHER PUBLICATIONS

R1-134393, 3GPP TSG-RAN WG1 #74 bis, PACH Procedure for Coverage Enhancement of MTG UEs, Sep. 28, 2013.
(Continued)

*Primary Examiner* — Sulaiman Nooristany

(57) ABSTRACT

A Machine-to-machine (M2M) terminal (11) comprises a radio communication unit (111) and a controller (112). The radio communication unit (111) is configured to communicate with a base station (13). The controller (112) is configured to change at least one of a cell selection operation, a cell reselection operation, and a handover operation according to whether a specific coverage enhancement processing is required or according to whether the specific coverage enhancement processing is supported by at least one of a cell (13) in which the M2M terminal (11) camps on and a neighbouring cell (14) of the cell (13) which the M2M terminal (11) camps on. It is thus possible to provide an improved technique for allowing the M2M terminal that is supporting a special coverage enhancement processing for M2M terminals to camp on an appropriate cell.

10 Claims, 12 Drawing Sheets

Related U.S. Application Data continuation of application No. 15/585,832, filed on May 3, 2017, now Pat. No. 10,757,620, which is a continuation of application No. 15/114,694, filed as application No. PCT/JP2014/004540 on Sep. 4, 2014, now Pat. No. 10,341,916.

(51) Int. Cl.

| | | |
|---|---|---|
| *H04L 12/18* | (2006.01) | |
| *H04W 4/06* | (2009.01) | |
| *H04W 4/70* | (2018.01) | |
| *H04W 36/00* | (2009.01) | |
| *H04W 36/04* | (2009.01) | |
| *H04W 36/16* | (2009.01) | |
| *H04W 36/30* | (2009.01) | |
| *H04W 48/20* | (2009.01) | |

(52) U.S. Cl.
CPC ......... *H04W 4/70* (2018.02); *H04W 36/0016* (2013.01); *H04W 36/00837* (2018.08); *H04W 36/0085* (2018.08); *H04W 36/04* (2013.01); *H04W 36/16* (2013.01); *H04W 36/165* (2013.01); *H04W 36/30* (2013.01); *H04W 48/20* (2013.01)

(56) References Cited

U.S. PATENT DOCUMENTS

| | | |
|---|---|---|
| 2006/0062237 A1 | 3/2006 | Kim |
| 2006/0160539 A1 | 7/2006 | Juan et al. |
| 2008/0170526 A1 | 7/2008 | Narang et al. |
| 2008/0182577 A1 | 7/2008 | Ng et al. |
| 2009/0176490 A1 | 7/2009 | Kazmi et al. |
| 2010/0006749 A1 | 1/2010 | Hick et al. |
| 2010/0067496 A1 | 3/2010 | Choi |
| 2012/0099663 A1 | 4/2012 | Sabol |
| 2012/0142352 A1 | 6/2012 | Zhang et al. |
| 2013/0058311 A1 | 3/2013 | Park et al. |
| 2013/0059585 A1 | 3/2013 | Giloh |
| 2013/0077514 A1 | 3/2013 | Dinan |
| 2013/0143572 A1 | 6/2013 | Kang et al. |
| 2013/0237267 A1 | 9/2013 | Lee et al. |
| 2013/0295946 A1 | 11/2013 | Panchal et al. |
| 2013/0324141 A1 | 12/2013 | Jung et al. |
| 2013/0343223 A1 | 12/2013 | Martin et al. |
| 2014/0198772 A1 | 7/2014 | Baldemair et al. |
| 2014/0206408 A1 | 7/2014 | Choi et al. |
| 2015/0079989 A1* | 3/2015 | Tambaram Kailasam ................... H04W 36/0088 455/436 |
| 2015/0085717 A1* | 3/2015 | Papasakellariou .... H04W 48/12 370/280 |
| 2015/0117410 A1* | 4/2015 | Wu ................... H04W 36/0069 370/329 |
| 2015/0124746 A1 | 5/2015 | Wu et al. |
| 2015/0140540 A1 | 5/2015 | Kobayashi |
| 2015/0289127 A1 | 10/2015 | Ou et al. |
| 2015/0365943 A1 | 12/2015 | Seok |
| 2016/0044737 A1 | 2/2016 | Kwon |
| 2016/0316411 A1 | 10/2016 | Jung et al. |

OTHER PUBLICATIONS

Office Action dated Apr. 21, 2020, issued in counterpart Chinese Patent Application No. 201710017959.X by the Chinese Patent Office.
Alcatel-Lucent, Alcatel-Lucent Shanghai Bell, PBCH Coverage Enhancement for MTC UE, 3GPP TSG-RAN WGI #75 R1-135154, Nov. 1, 2013.
Japanese Office Action dated Nov. 12, 2019, issued by the Japanese Patent Office in counterpart Japanese Patent Application No. 2018-187475.
Extended European Search Report dated Jan. 8, 2020, by The European Patent Office in counterpart European Patent Application No. 19193184,9.
"LTE (Long Term Evolution), Tayal's Way to Learn", pp. 1-19 (May 13, 2013).
Supplemental Final Office Action issued by the U.S. Patent and Trademark Office in U.S. Appl. No. 15/704,901 dated Mar. 8, 2019.
Indian Office Action dated Feb. 13, 2019, issued by the Indian Patent Office in counterpart Indian Application No. 201617025716.
Notice of Allowance dated Oct. 26, 2018, by The United States Patent and Trademark Office in counterpart U.S. Appl. No. 15/114,694.
CATT, "Analysis of coverage improvement for low-cost MTC LTE UEs," 3GPP TSG RAN WG1 Meeting #71, R1-125247, Agenda Item 6.3.3, New Orleans, USA, Nov. 12-16, 2012 (7 pages).
Ericsson, ST-Ericsson, "Coverage enhancements for MTC—system information," 3GPP TSG-RAN WG1 Meeting #72bis, R1-131680, Agenda Item 7.2.4.2, Chicago, USA, Apr. 15-19, 2013 (8 pages).
Extended European Search Report issued by the European Patent Office for European Application No. 18162992.4 dated Jun. 8, 2018 (7 pages).
U.S. Office Action issued by the U.S. Patent and Trademark Office for the U.S. Appl. No. 15/114,694 dated Jun. 7, 2018 (34 paqes).
Notification of First Office Action dated Sep. 20, 2018, issued by the China National Intellectual Property Administration in counterpart Chinese Patent Application No. 201480074671.0.
CATT, "Discussion on mobility support for Low Complexity MTC UEs and MTC coverage enhancement," 3GPP TSG RAN WG2 Meeting #84, R2-134040, Agenda Item 7.9.2, San Francisco, USA, 4 pages (Nov. 11-15, 2013).
Extended European Search Report issued by the European Patent Office for European Application No. 14881069.0 dated Aug. 3, 2017 (9 pages).
U.S. Office Action issued by the U.S. Patent and Trademark Office for the U.S. Appl. No. 15/114,694 dated Sep. 6, 2017 (35 pages).
International Search Report corresponding to PCT/JP2014/004540 dated Dec. 9, 2014 (one page).
Alcatel-Lucent, Alcatel-Lucent Shanghai Bell, "Mobility issues of low complexity UE with/without enhanced coverage mode" 3GPP TSG-RAN WG2#84 R2-134330, Nov. 1, 2013 (5 pages).
Sony, "Enhanced Coverage Mobility Issues", 3GPP TSG-RAN WG2#84 R2-133821, Nov. 1, 2013 (5 pages).
3GPP TR 37.868 V11.0.0 (Sep. 2011), "3rd Generation Partnership Project; Technical Specification Group Radio Access Network; Study on RAN Improvements for Machine-type Communications; (Release 11)", Sep. 2011 (pp. 1-28).
3GPP TR 35 888 V12.0.0 (Jun. 2013), "3rd Generation Partnership Project; Technical Specification Group Radio Access Network, Study on provision of low-cost Machine-Type Communications (MTG) User Equipments (UEs) based on L TE (Release 12)", Jun. 2013 (pp. 1-55).
3GPP R1-135943, Vodafone, "Way Forward on P-BCH for MTG enhanced coverage", 3GPP TSG RAN WG1 #75, San Francisco, USA, Nov. 11-15, 2013 (2 pages).
3GPP R1-135944, Vodafone, "Way Forward on PRACH for MTG enhanced coverage", 3GPP TSG RAN WG1 #75, San Francisco, USA, Nov. 11-15, 2013 (4 pages).
3GPP R1-136001, Vodafone et al. "Way forward on PDCCH, POSCH, PUCCH and PUSCH for MTG enhanced coverage", 3GPP TSG RAN WG1 #75, San Francisco, USA, Nov. 11-15, 2013 (2 pages).
EP Office Action for EP Application No. EP19193184.9 dated Dec. 16, 2021.
Amer Catovic et al., "Impact of SIB Scheduling on the Standby Battery Life of Mobile Devices in UMTS", 16th IST Mobile and Wireless Communications Summit, Jul. 1, 2007, USA.
Japanese Office Action for JP Application No. 2021-180261 dated Nov. 8, 2022 with English Translation.
3GPP TS 36.331 V11.6.0, "3rd Generation Partnership Project; Technical Specification Group Radio Access Network; Evolved Universal Terrestrial Radio Access (E-UTRA); Radio Resource Control (RRC); Protocol specification (Release 11)", Jan. 7, 2014, pp. 156-159,167-173.

(56) References Cited

OTHER PUBLICATIONS

EP Office Action for EP Application No. 19193184.9, mailed on Jul. 4, 2023.
3GPP TS 36.331 V12.0.0 (Dec. 2013), "3rd Generation Partnership Project; Technical Specification Group Radio Access Network; Evolved Universal Terrestrial Radio Access (E-UTRA); Radio Resource Control (RRC); Protocol specification (Release 12)", Dec. 2013.
3GPP R2-130532, NTT DOCOMO, Inc., "Wideband RSRQ measurements in RRC_IDLE", 3GPP TSG-RAN WG2 #81, St. Julian's, Malta, Jan. 28-Feb. 1, 2013.
3GPP R2-133821, Sony, "Enhanced Coverage Mobility Issues", 3GPP TSG-RAN WG2 Meeting #84, San Francisco, USA, Nov. 11-15, 2013.
3GPP R2-133960, Vodafone Group, "Consideration of mobility aspects for Low complexity MTC UE and MTC enhanced coverage", 3GPP TSG RAN WG2 #84, San Francisco, USA, Nov. 11-15, 2013.
CN Office Action for CN Application No. 202010800180.7, mailed on Oct. 25, 2023 with English Translation.
3GPP TS 36.304 V9.11.0 (Jun. 2012), "3rd Generation Partnership Project; Technical Specification Group Radio Access Network; Evolved Universal Terrestrial Radio Access (E-UTRA); User Equipment (UE) procedures in idle mode (Release 9)" Jun. 2012.
3GPP TS 36.304 V11.6.0 (Dec. 2013), "3rd Generation Partnership Project; Technical Specification Group Radio Access Network; Evolved Universal Terrestrial Radio Access (E-UTRA); User Equipment (UE) procedures in idle mode (Release 11)" Dec. 2013.
U.S. Office Action for U.S. Appl. No. 18/122,470, mailed on Apr. 19, 2024.
U.S. Office Action for U.S. Appl. No. 18/122,470, mailed on Jan. 17, 2024.

\* cited by examiner

MACHINE-TO-MACHINE (M2M) TERMINAL, BASE STATION, METHOD, AND COMPUTER READABLE MEDIUM

CROSS-REFERENCE TO RELATED PATENT APPLICATIONS

This application is a continuation of U.S. patent application Ser. No. 16/934,688, filed Jul. 21, 2020, which is a continuation of U.S. patent application Ser. No. 15/585,832 filed May 3, 2017, issued as U.S. Pat. No. 10,757,620, which is a continuation of U.S. patent application Ser. No. 15/114,694, filed Jul. 27, 2016, issued as U.S. Pat. No. 10,341,916, which is a National Stage Entry of International Application No. PCT/JP2014/004540, filed Sep. 4, 2014, which claims priority from Japanese Patent Application No. 2014-015867, filed Jan. 30, 2014. The entire contents of the above-referenced applications are expressly incorporated herein by reference.

TECHNICAL FIELD

The present disclosure relates to a radio communication system which performs a communication control in order to enhance coverage.

TECHNICAL FIELD

In the 3GPP Long Term Evolution (LTE), standardization of techniques for improving deterioration of communication quality due to recent sharp increase in mobile traffic and for achieving faster communication has been performed. Further, standardization of techniques for avoiding increase in a control signaling load due to connections of an enormous number of Machine to Machine (M2M) terminals to an LTE network has been performed (Non-Patent Literature 1). The M2M terminals are, for example, terminals that perform communication without human intervention. The M2M terminals are placed in various types of equipment including machines (e.g., vending machines, gas meters, electric meters, vehicles, railway vehicles, and ships) and sensors (e.g., environmental, agricultural, and traffic sensors). In the LTE, communication performed by the M2M terminals are referred to as Machine Type Communications (MTC) and a terminal performing the MTC is referred to as an MTC terminal (MTC User Equipment (MTC UE)).

While M2M service providers need to distribute an enormous number of M2M terminals, there is a limit to the cost allowable for each M2M terminal. Therefore, it is required M2M terminals be implemented at a low cost, and M2M terminals be able to perform communication with low power consumption, for example. Further, in one use case, MTC UEs perform communication while they are fixedly or statically installed in buildings. In this case, the radio quality of MTC UEs may be always low and accordingly coverage enhancement technique is especially needed for MTC devices compared to normal UEs having mobility (e.g., mobile telephones, smartphones, tablet computers, and notebook personal computers (notebook PCs)). Further, functional restrictions contributing to reduction of the cost include, for example, a low maximum transmission power, a small number of reception antennas, no support of high-order modulation schemes (e.g., 64 Quadrature Amplitude Modulation (64QAM)), and a narrow operating bandwidth (e.g., 1.25 MHz), which lower the maximum transmission rate of MTC UEs. Therefore, in the LTE, standardization of techniques for enhancing communication characteristics of MTC UEs (i.e., coverage), which are expected to be lower than those of normal UE has been performed (Non-Patent Literature 2). In the following description, some examples of the techniques for enhancing coverage of MTC UEs discussed in the LTE are described. It can be said that the coverage enhancement techniques (coverage enhancement processing) for MTC UEs described below are processing for enhancing or improving communication characteristics or communication quality of MTC UEs. The state of a UE to which these special coverage enhancement techniques has been applied is referred to as a coverage enhancement mode (Enhanced Coverage Mode (ECM)).

The ECM can improve, for example, a reception characteristic of a Physical Broadcast Channel (PBCH), a transmission characteristic of a Physical Random Access Channel (PRACH) preamble (i.e., detection characteristic in an eNB), a reception characteristic of a Physical Downlink Shared Channel (PDSCH), and a transmission characteristic of a Physical Uplink Shared Channel (PUSCH). The PBCH is a downlink broadcast channel used by an eNB to transmit broadcast information commonly used within a cell. The PRACH is an uplink physical channel used by a UE for an initial access to a radio base station (eNB). The PDSCH is a downlink physical channel used for data reception by a UE. The PUSCH is an uplink physical channel used for data transmission by a UE.

One processing that is being discussed to improve a reception characteristic of the PBCH is to repeatedly transmit broadcast information on the PBCH a number of extra times as compared to the normal operation by a predetermined number of times (Non-Patent Literature 3). One processing that is being discussed to improve a transmission characteristic of the PRACH is to repeatedly transmit the PRACH (i.e., preamble) a predetermined number of times (Non-Patent Literature 4). Further, one processing that is being discussed to improve a reception characteristic of the PDSCH and a transmission characteristic of the PUSCH is to repeatedly transmit the PDSCH and the PUSCH over multiple subframes (Non-Patent Literature 5). According to the above processing, communication characteristics of MTC UEs that is expected to be lower than that of normal UEs will be improved.

It is expected that the coverage enhancement processing in the ECM is performed for MTC UEs that perform a delay tolerant access. The delay tolerant access is defined as being a new EstablishmentCause that is specified in an RRC Connection Request message and is used, for example, to control an overload. The delay tolerant access is mainly intended for MTC UEs that execute a delay-tolerant MTC application. For example, in a metering service (meter reading service), there is no need to send a metering report to a remote system in real time (or in exact communication cycles) and a long delay may be allowed for the transmission of the metering report. When an eNB imposes overload control on the delay tolerant access, the eNB may reject an RRC Connection Request transmitted by a RRC Connection Request message that contains "EstablishmentCause" indicating the delay tolerant access.

CITATION LIST

Non Patent Literature

[Non-Patent Literature 1] 3GPP TR 37.868 V11.0.0 (2011-09), "3rd Generation Partnership Project; Technical Specification Group Radio Access Network; Study on RAN Improvements for Machine-type Communications; (Release 11)", Sep., 2011

[Non-Patent Literature 2] 3GPP TR 36.888 V12.0.0 (2013-06), "3rd Generation Partnership Project; Technical Specification Group Radio Access Network; Study on provision of low-cost Machine-Type Communications (MTC) User Equipments (UEs) based on LTE (Release 12)", Jun., 2013

[Non-Patent Literature 3] 3GPP R1-135943, Vodafone, "Way Forward on P-BCH for MTC enhanced coverage", 3GPP TSG RAN WG1 #75, San Francisco, USA, 11-15 Nov. 2013

[Non-Patent Literature 4] 3GPP R1-135944, Vodafone, "Way Forward on PRACH for MTC enhanced coverage", 3GPP TSG RAN WG1 #75, San Francisco, USA, 11-15 Nov. 2013

[Non-Patent Literature 5] 3GPP R1-136001, Vodafone et al. "Way forward on PDCC,H, PDSCH, PUCCH and PUSCH for MTC enhanced coverage", 3GPP TSG RAN WG1 #75, San Francisco, USA, 11-15 Nov. 2013

SUMMARY OF INVENTION

Technical Problem

The present inventor has examined many problems that are caused when the coverage enhancement processing in the ECM is applied to MTC UEs (M2M terminals). As one example of such problems, the present inventor has examined cell selection, cell reselection, and handover of MTC UEs that support the ECM. That is, a suitable cell for an MTC UE to stay in (camp on) may vary according to whether this MTC UE requires the ECM or not. However, existing cell selection criteria (e.g., cell selection criterion S (S-criterion) in the LTE), cell reselection criteria (e.g., cell-ranking criterion R (R-criterion) in the LTE), and handover criteria (e.g., measurement report triggering condition for Events A1 to A6 in the LTE) do not consider whether the ECM is required for the MTC UE. Therefore, there is a possibility that a suitable cell for the MTC UE to camp on is not appropriately selected. Further, in another case, a suitable cell for the MTC UE to stay in (camp on) may vary according to whether or not the ECM is supported by at least one of the camped cell that the MTC UE camps on and its neighbouring cells.

In view of the above, one object of embodiments disclosed in the specification is to provide an MTC UE (M2M terminal), a base station, a method, and a program that are enhanced to allow the MTC UE that is supporting special coverage enhancement processing (e.g., coverage enhancement processing in the ECM) to camp on an appropriate cell. It should be noted that this object is merely one of objects accomplished by the embodiments disclosed in the specification. The other objects or problems and novel features will be made apparent from the specification or the accompanying drawings.

Solution to Problem

In one aspect, an M2M terminal includes a radio communication unit and a controller. The radio communication unit is configured to communicate with a base station. The controller is configured to change at least one of a cell selection operation, a cell reselection operation, and a handover operation according to whether a specific coverage enhancement processing is required or according to whether the specific coverage enhancement processing is supported by at least one of a camped cell which the M2M terminal camps on and a neighbouring cell of the camped cell.

In one aspect, a base station apparatus includes a radio communication unit and a controller. The radio communication unit is configured to communicate with an M2M terminal. The controller is configured to assist the M2M terminal so that at least one of a cell selection operation, a cell reselection operation, and a handover operation by the M2M terminal is changed according to whether a specific coverage enhancement processing is required for the M2M terminal or according to whether the specific coverage enhancement processing is supported by at least one of a camped cell which the M2M terminal camps on and a neighbouring cell of the camped cell.

In one aspect, a method performed by an M2M terminal includes changing at least one of a cell selection operation, a cell reselection operation, and a handover operation according to whether a specific coverage enhancement processing is required for the M2M terminal or according to whether the specific coverage enhancement processing is supported by at least one of a camped cell which the M2M terminal camps on and a neighbouring cell of the camped cell.

In one aspect, a method performed by a base station apparatus includes assisting the M2M terminal so that at least one of a cell selection operation, a cell reselection operation, and a handover operation by the M2M terminal is changed according to whether a specific coverage enhancement processing is required for the M2M terminal or according to whether the specific coverage enhancement processing is supported by at least one of a camped cell which the M2M terminal camps on and a neighbouring cell of the camped cell.

In one aspect, an M2M terminal includes a radio communication unit and a controller. The radio communication unit is configured to communicate with a base station. The controller is configured to receive, from the base station, first and second values that are substituted into a first parameter used for cell reselection or handover. The first value is substituted into the first parameter by the controller when a specific coverage enhancement processing is not required for the M2M terminal. The second value is substituted into the first parameter by the controller when the specific coverage enhancement processing is required for the M2M terminal.

In one aspect, a base station apparatus include a radio communication unit and a controller. The radio communication unit is configured to communicate with an M2M terminal. The controller is configured to notify the M2M terminal of first and second values that are substituted into a first parameter used by the M2M terminal for cell reselection or handover. The first value is substituted into the first parameter by the M2M terminal when a specific coverage enhancement processing is not required for the M2M terminal. The second value is substituted into the first parameter by the M2M terminal when the specific coverage enhancement processing is required for the M2M terminal.

In one aspect, a method performed by an M2M terminal includes receiving, from a base station, first and second values that are substituted into a first parameter used for cell reselection or handover. The first value is substituted into the first parameter by the M2M terminal when a specific coverage enhancement processing is not required for the M2M terminal. The second value is substituted into the first parameter by the M2M terminal when the specific coverage enhancement processing is required for the M2M terminal.

In one aspect, a method performed by a base station apparatus includes notifying the M2M terminal of first and second values that are substituted into a first parameter used by the M2M terminal for cell reselection or handover. The first value is substituted into the first parameter by the M2M terminal when a specific coverage enhancement processing is not required for the M2M terminal. The second value is substituted into the first parameter by the M2M terminal when the specific coverage enhancement processing is required for the M2M terminal.

In one aspect, a base station apparatus includes a radio communication unit and a controller. The radio communication unit is configured to communicate with an M2M terminal. The controller is configured to notify the M2M terminal of a cell reselection parameter or a handover parameter adjusted according to whether a specific coverage enhancement processing is required for the M2M terminal.

In one aspect, a method performed by a base station apparatus includes notifying an M2M terminal of a cell reselection parameter or a handover parameter adjusted according to whether a specific coverage enhancement processing is required for the M2M terminal.

In one aspect, a program contains a set of instructions (software codes) which, when loaded into a computer, causes the computer to perform any one of the aforementioned methods.

Advantageous Effects of Invention

According to the above aspect, it is possible to provide an MTC UE (M2M terminal), a base station, a method, and a program that are improved to allow the MTC UE that is supporting special coverage enhancement processing (e.g., coverage enhancement processing in the ECM) to camp on an appropriate cell. It should be noted that this effect is merely one of effects expected to be brought about by the embodiments disclosed in the specification.

DESCRIPTION OF EMBODIMENTS

Hereinafter, specific embodiments will be described in detail with reference to the drawings. The same or corresponding components are denoted by the same reference symbols throughout the drawings, and repetitive explanations will be omitted as necessary for the sake of clarity.

Each of embodiments described below may be implemented independently or in combination with any other. These embodiments include novel characteristics different from one another. Accordingly, these embodiments contribute to achieving objects or solving problems different from one another and contribute to obtaining advantages different from one another.

First Embodiment

Figure 1:
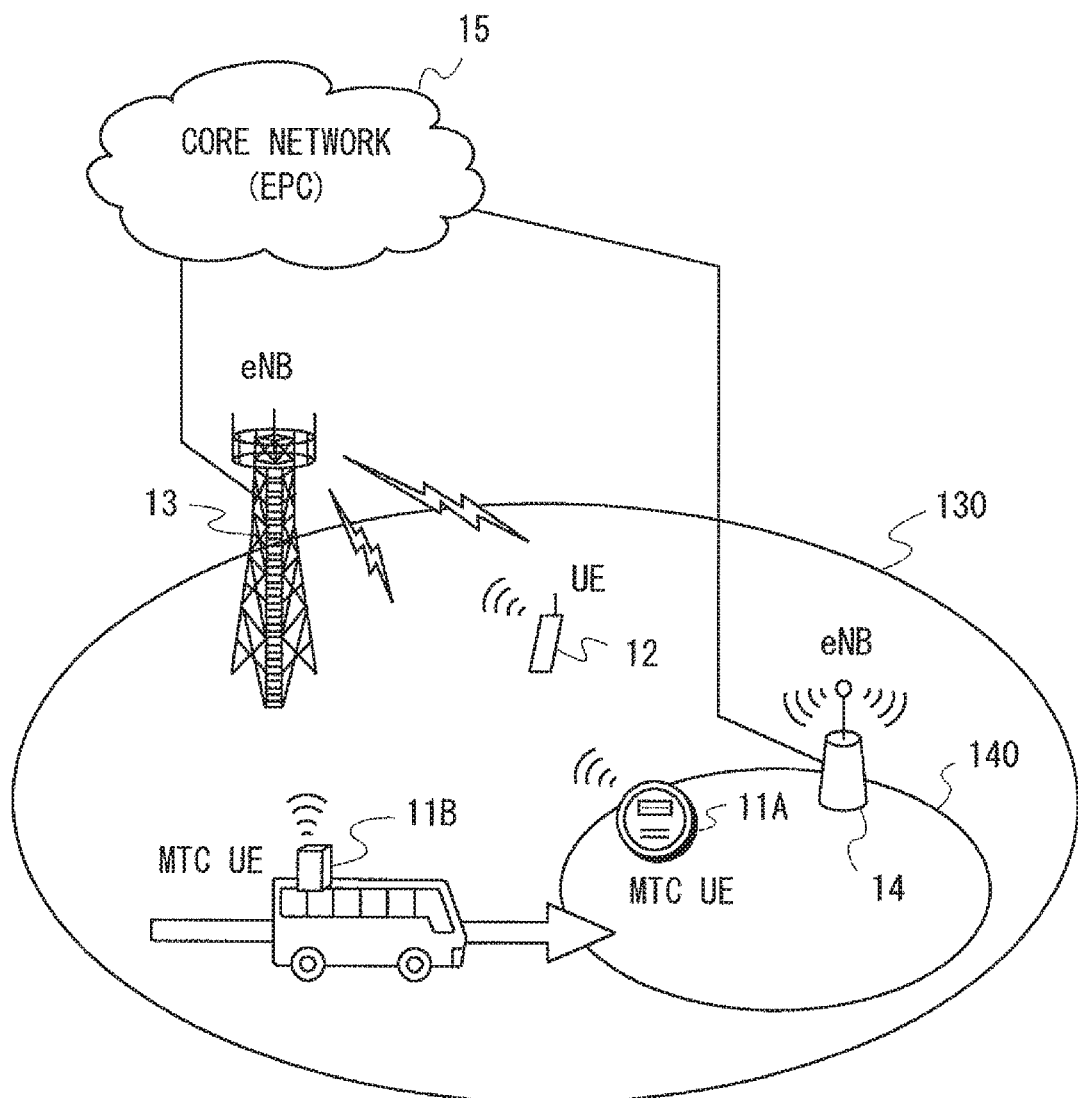
FIG. 1 is a diagram showing a configuration example of a radio communication system according to a first embodiment.

FIG. 1 shows a configuration example of a radio communication system according to this embodiment. This radio communication system provides communication services, such as voice communication or packet data communication or both, for example. With reference to FIG. 1, the radio communication system includes M2M terminals 11 (11A, 11B), a normal radio terminal 12 which is not an M2M terminal, a base station 13, a base station 14, and a core network 15. The radio terminal 12 is, for example, a mobile telephone, a smartphone, a tablet computer, or a notebook PC. In this embodiment, the radio communication system is described as being a 3GPP LTE system. That is, the M2M terminals 11 correspond to MTC UEs, the radio terminal 12 corresponds to a normal UE which is not an MTC UE, the base stations 13 and 14 correspond to eNodeBs (eNBs), and the core network 15 corresponds to an Evolved Packet Core (EPC).

FIG. 1 shows an example of a heterogeneous network (HetNet). That is, the eNB 13 manages a cell 130 and the eNB 14 manages a cell 140 which covers an area narrower than that covered by the cell 130. For example, the eNB 13 is a macro base station and the eNB 14 is a pico base station. This embodiment may, however, be applied to a homogeneous network in which the cell 130 and the cell 140 have the same degree of coverage.

In FIG. 1, the MTC UE 11A is fixedly installed near a boundary between the cell 130 of the eNB 13 and the cell 140 of the eNB 14 and radio quality of the MTC UE 11A will probably be poor. If the capabilities or functions of the MTC UE 11A are limited compared to those of the normal UE 12 (e.g., a lower maximum transmission power, a smaller number of reception antennas, no support of high-order modulations), the degradation in the radio quality of the MTC UE 11A will become more serious. On the other hand, the MTC UE 11B is installed in a transportation machine such as a vehicle, a railway vehicle, or a ship and therefore has mobility. The MTC UE 11B moves from the cell 130 to the cell 140. If the capabilities or functions of the MTC UE 11B are limited compared to those of the normal UE 12, a mobility characteristic of the MTC UE 11B may be lower than that of the normal terminal 12. Consequently, the communication characteristic of the MTC UE 11 will probably be degraded since it is significantly affected by radio quality variations due to the movement of the MTC UE 11. Therefore, the MTC UEs 11 (11A and 11B) according to this embodiment are configured to support the aforementioned Enhanced Coverage Mode (ECM) and to perform coverage enhancement processing in the ECM.

As already stated above, the coverage enhancement processing in the ECM can be said as processing for enhancing or improving communication characteristics (communication quality) of MTC UEs. As already stated above, the coverage enhancement processing in the ECM may include at least one of the following processing (a) to (d) or may include other processing (e.g., (e) and (f)):

(a) Repeatedly transmitting broadcast information on a PBCH a number of extra times as compared to the normal operation by a predetermined number of times;
(b) Repeatedly transmitting a PPACH (PRACH preamble) a predetermined number of times;
(c) Repeatedly transmitting a PDSCH over multiple subframes;
(d) Repeatedly transmitting a PUSCH over multiple subframes;
(e) Increasing the power spectral density (PSD) of one or both of a PDSCH and a PUSCH (PSD boosting); and
(f) Performing frequency hopping during repetitive transmission of one or both of a PDSCH and a PUSCH.

The subframe is a unit constituting a LTE radio frame. One radio frame has a length of ten milliseconds and is composed of ten subframes. Therefore, one subframe has a length of one millisecond.

One subframe includes 14 symbols in a time domain (single carrier frequency division multiple access (SC-FDMA) symbols in uplink and orthogonal frequency division multiplexing (OFDM) symbols in downlink).

In the following description, communication control for the ECM according to this embodiment is described. The MTC UE 11 according to this embodiment changes at least one of a cell selection operation, a cell reselection operation, and a handover operation according to whether the ECM (coverage enhancement processing in the ECM) is required for the MTC UE 11 or according to whether the ECM is supported by at least one of the cell which the MTC UE 11 camps on (serving cell) (e.g., the cell 130) and one of its neighbouring cells (e.g., the cell 140). The determination regarding whether the ECM is required for the MTC UE 11 (or whether the ECM should be executed in the MTC UE 11) may be performed either by the MTC UE 11 or by the eNB 13.

The cell selection operation by the MTC UE 11 includes cell selection when the MTC UE 11 does not camp on any cell (or eNB). The cell reselection operation by the MTC UE 11 includes cell change performed after the MTC UE 11 has normally camped on one cell. The handover operation by the MTC UE 11 includes an operation of transmitting a handover request or an operation of transmitting a measurement report that triggers handover. It is well known that, in many radio communication systems including the LTE system, the execution of a handover is determined by an apparatus on the network side (e.g., base station), not by a radio terminal (UE), and the radio terminal (UE) sends a measurement report to trigger the handover to the network (e.g., base station). The measurement report typically indicates radio quality of the serving cell which the radio terminal (UE) camps on and radio quality of its neighbouring cells.

For example, the MTC UE 11 may vary at least one of these operations (i.e., cell selection operation, cell reselection operation, and handover operation) depending on whether or not the MTC UE 11 has determined that the ECM (i.e., the coverage enhancement processing in the ECM) is required for the MTC UE 11 itself. Alternatively, the MTC UE 11 may vary at least one of these operations depending on whether or not the MTC UE 11 is executing the ECM. In one more alternative, the MTC UE 11 may vary at least one of these operations depending on whether or not the eNB 13 has determined that the ECM is required for the MTC UE 11.

On the other hand, the eNB 13 may assist the MTC UE 11 so that at least one of the cell selection operation, the cell reselection operation, and the handover operation by the MTC UE 11 is changed according to whether the ECM is required for the MTC UE 11 or whether the coverage enhancement processing is supported by at least one of the cell which the MTC UE 11 camps on (e.g., the cell 130) and one of its neighbouring cells (e.g., the cell 140). The eNB 14 may operate in similar manner as the eNB 13. For example, the eNB 13 may transmit, in the cell 130, a notification indicating that the ECM is supported by the cell 130 (or the eNB 13) so that the MTC UE 11 can receive the notification. Further or alternatively, the eNB 13 may transmit to the MTC UE 11 at least one of a cell selection parameter, a cell reselection parameter, and a handover parameter that are adjusted for an MTC UE that requires the ECM (or executes the ECM).

In this specification, the operations performed by the MTC UEs 11 when the ECM (i.e., coverage enhancement processing in the ECM) is not required for the MTC UEs 11 are called a "normal" cell selection operation, a "normal" cell reselection operation, and a "normal" handover operation. On the other hand, the operations performed by the MTC UEs 11 when the ECM is required for the MTC UEs 11 are called an "ECM-specific" cell selection operation, an "ECM-specific" cell reselection operation, and an "ECM-specific" handover operation. The ECM-specific cell selection operation, the ECM-specific cell reselection operation, and the ECM-specific handover operation may be adjusted so that a cell (or an eNB) that is supporting the ECM can be readily selected as the target cell for the MTC UE 11 to camp on or to perform handover, compared to a cell (or the eNB) that does not support the ECM.

Figure 2:
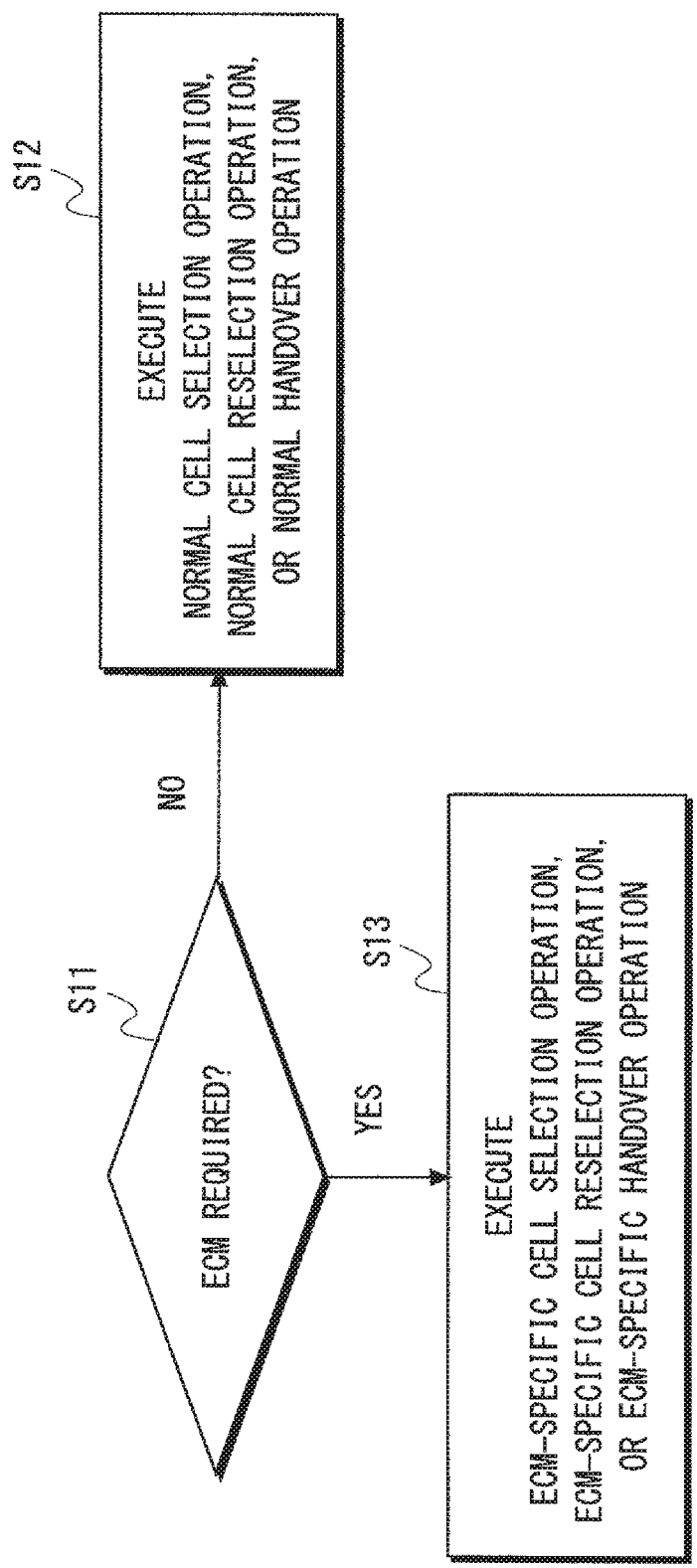
FIG. 2 is a flowchart showing one example of operations of an M2M terminal (MTC UE) according to the first embodiment.

FIG. 2 is a flowchart showing one example of operations of the MTC UE 1 according to this embodiment. In Step S11, the MTC UE 11 recognizes whether the ECM is required. As already stated above, the MTC UE 11 may itself determine necessity of the ECM (or necessity of executing the ECM) or may be notified or instructed by the eNB 13 about the necessity that has been determined by the eNB 13. When the ECM is not required for the MTC UE 11 (NO in Step S11), the MTC UE 11 performs the normal cell selection operation, the normal cell reselection operation, or the normal handover operation (Step S12). On the other hand, when the ECM is required for the MTC UE 11 (YES in Step S12), the MTC UE 11 performs the ECM-specific cell selection operation, the ECM-specific cell reselection operation, or the ECM-specific handover operation (Step S13).

The procedure in FIG. 2 may be changed as follows. For example, in Step S11, the MTC UE 11 may detect whether the ECM is supported by at least one of the cell which the MTC UE 11 camps on (serving cell) (e.g., the cell 130) and one of its neighbouring cells (e.g., the cell 140). When neither the cell which the MTC UE 11 camps on (e.g., the cell 130) nor any of its neighbouring cells (e.g., the cell 140) is supporting the ECM, the MTC UE 11 may perform the normal cell selection operation, the normal cell reselection operation, or the normal handover operation. On the other hand, when at least one of the cell which the MTC UE 11 camps on (e.g., the cell 130) and one of its neighbouring cells (e.g., the cell 140) is supporting the ECM, the MTC UE 11 may perform the ECM-specific cell selection operation, the ECM-specific cell reselection operation, or the ECM-specific handover operation.

According to this embodiment, the following effects can be expected. That is, the MTC UE 11 according to this embodiment changes at least one of a cell selection operation, a cell reselection operation, and a handover operation according to whether the ECM is required for the MTC UE 11. Alternatively, the MTC UE 11 changes at least one of a cell selection operation, a cell reselection operation, and a handover operation according to whether the ECM is supported by at least one of the cell which the MTC UE 11 camps on (e.g., the cell 130) and one of its neighbouring cells (e.g., the cell 140). Consequently, when the ECM is required for the MTC UE 11, the MTC UE 11 can camp on an appropriate cell (e.g., ECM-supporting cell or cell in which a good communication characteristic is expected due to the coverage enhancement processing by the ECM).

In the following paragraphs, some specific examples of the ECM-specific cell selection, cell reselection, and handover operations and some specific examples of corresponding operations of the eNBs (eNBs 13 and 14) for assisting these ECM-specific operations are described.

First Example

In the first example, the MTC UE 11 considers whether each of the cells 130 and 140 (or the eNBs 13 and 14) is supporting the ECM in the ECM-specific operation (the cell selection operation, the cell reselection operation, or the handover operation). The eNBs 13 and 14 respectively transmit, in the cells 130 and 140, a notification indicating whether the cell is supporting the ECM in order to assist the ECM-specific operation by the MTC UE 11. For example, the MTC UE 11 may receive a notification indicating whether the cell is supporting the ECM from each of the eNBs 13 and 14 and preferentially select a cell that is supporting the ECM. Alternatively, the MTC UE 11 may receive a notification indicating whether the cell is supporting the ECM from each of the eNBs 13 and 14 and send to the eNB 13 a list of cells that are desired to be preferentially selected. In this case, the eNB 13 may select the cell that the MTC UE 11 should camp on based on the cell list received from the MTC UE 11.

It is preferable that the notification indicating whether the cell is supporting the ECM is transmitted on a broadcast channel that can be received by the MTC UEs 11 having no radio connection (RRC connection) with the eNB, i.e., the MTC UEs 11 in an idle state. In other words, preferably, this notification is broadcast information that can be received by the MTC UEs 11 in the idle state (RRC_IDLE). Specifically, a Broadcast Control Channel (BCCH), which is one of the logic channels in the LTE, may be used for transmitting this notification.

The terms "idle state" and "connected state" used in the specification is defined as follows. The "idle state" is a state in which a radio connection between a UE and an eNB has been released. Accordingly, the eNB has no information (UE context) regarding the UE in the idle state. The location of the UE in the idle state is tracked by a core network at location-registration-area level (e.g., tracking area or routing area). The core network can reach the UE in the idle state by paging. Further, the UE in the idle state cannot perform unicast data transmission to or from the eNB. Accordingly, the UE in the idle state should transition to the connected state in order to perform unicast data transmission. Examples of the idle state include: (1) an RRC idle state in a Universal Terrestrial Radio Access Network (UTRAN); (2) an RRC_IDLE state in an Evolved UTRAN (E-UTRAN); and (3) an Idle state in WiMAX (IEEE 802.16-2004), mobile WiMAX (IEEE 802.16e-2005), and WiMAX2 (IEEE 802.16m).

On the other hand, the connected state is a state in which the UE is connected to the eNB. Accordingly, the eNB has information (UE context) regarding the UE in the connected state. The location of the UE in the connected state is tracked by the core network at tracking-area level or base-station level. In most cases, the UE in the connected state can perform unicast data transmission to and from the eNB. However, when the UE is in a CELL_PCH state and a URA_PCH state in the UTRAN, the UE context is held by a base station controller (Radio Network Controller (RNC)), but no dedicated channel is allocated to the UE either in uplink or in downlink. Examples of the connected state include: (1) an RRC connected state in the UTRAN; (2) an RRC_CONNECTED state in the E-UTRAN; and (3) a connected state in the WiMAX, the mobile WiMAX, and the WiMAX2. Note that, the RRC connected state in the UTRAN includes a CELL_DCH state, a CELL_FACH state, a CELL_PCH state, and a URA_PCH state.

More specifically, the notification indicating whether the cell is supporting the ECM is preferably transmitted on a broadcast channel that can be received by each MTC UE 11 that is in the idle state (RCC_IDLE) and further in a detach state (EMM-DEREGISTERED). The detach state (EMM-DEREGISTERED) is one of EPS Mobility Management (EMM) states in the LTE. That is, the detach state (EMM-DEREGISTERED) is a state in which the UE is not registered in a mobility management element (e.g., Mobility Management Entity (MME)) in the core network (e.g., EPC) and the mobility management of the UE is not performed. The location information of the UE in the detach state is not tracked by the MME, and, accordingly, the UE in the detach state is unreachable from the core network (EPC) by paging. The UE in the detach state needs to perform an initial cell selection (i.e., initial cell research), establish a radio connection with the eNB, and perform location registration in the core network (EPC), prior to performing communication. The BCCH can also be received by each MTC UE 11 that is in the idle state (RCC_IDLE) and further in the detach state (EMM-DEREGISTERED).

The BCCH is mapped to a transport channel, i.e., a Broadcast Channel (BCH) or a Downlink Shared Channel (DL-SCH). Further, the BCH, which the BCCH has been mapped to, is transmitted by each eNB using a physical channel, i.e., a Physical Broadcast Channel (PBCH). The PBCH is transmitted using a predetermined resource block of the first subframe in each radio frame and is updated at a period of 40 milliseconds (at a period of four radio frames). The broadcast information transmitted on the PBCH is a Master Information Block (MIB). Therefore, the notification indicating whether the cell is supporting the ECM may be contained in the MIB.

On the other hand, the DL-SCH, which the BCCH has been mapped to, is transmitted by each eNB using a physical channel, i.e., a Physical Downlink Shared Channel (PDSCH). Although the PDSCH is mainly used to transmit user data, transmission of the BCCH (i.e., broadcast information) is specified as one of the special uses of the PDSCH. The resource block used for the BCCH (broadcast information) is indicated by a control message in a Physical Downlink Control Channel (PDCCH). The broadcast information transmitted on the PDSCH is System Information Blocks (SIBs). Therefore, the notification indicating whether the cell is supporting the ECM may be contained in one of the existing SIBs (e.g., System Information Block Type 1 (SIB1)). Alternatively, this information may be contained in an SIB that is newly defined for the M2M, MTC UEs, or ECM.

The notification indicating whether the cell is supporting the ECM may indicate whether the ECM is supported in the cell 130 or 140 (or the eNB 13 or 14) either explicitly (e.g., flag bit) or implicitly. The implicit information may include configuration information for the coverage enhancement processing in the ECM (ECM radio resource configuration or ECM configuration).

The ECM radio resource configuration or the ECM configuration may include, for example, at least one of the following information items:

Configuration information regarding reception of broadcast information (PBCH);
Configuration information regarding reception of system information (System Information Block (SIB));
Configuration information regarding reception of paging (Paging Channel (PCH));
Configuration information regarding reception of downlink control information (Physical Downlink Control Channel (PDCCH));
Configuration information regarding reception of downlink data (PDSCH);
Configuration information regarding transmission of uplink control information (Physical Uplink Control Channel (PUCCH));
Configuration information regarding transmission of uplink data (PUSCH); and
Configuration information regarding measurement reporting of radio quality (Measurement Report).

The configuration information regarding reception of the broadcast information (PBCH) and the configuration information regarding reception of the system information (SIB) may be, for example, information indicating which subframe(s) and/or which OFDM symbol(s) is used to repeatedly transmit the broadcast information and (which kind of) system information. The configuration information regarding reception of paging may be, for example, information indicating which subframe(s) is used to repeatedly transmit paging. The configuration information regarding reception of the downlink control information (PDCCH) and reception of the downlink data (PDSCH) may be, for example, information indicating how many times they are repeatedly transmitted or may be information indicating which subframe(s) is used for repeatedly transmitting them. The configuration information regarding transmission of the uplink control information (PUCCH) and the transmission of the uplink data (PUSCH) may be, for example, information indicating how many times they are repeatedly transmitted or may be information indicating which subframe(s) is used for repeatedly transmitting them. The configuration information regarding measurement reporting of radio quality may be an offset value or a threshold applied to the measurement result of the radio quality while the ECM is being executed or may be an offset value or a threshold applied to determination on the report of the measurement result of the radio quality while the ECM is being executed.

Second Example

In the second example, in the MTC UE 11, the ECM-specific cell-selection, cell-reselection, and handover operations use a criterion in common with that used by the normal cell-selection, cell-reselection, and handover operations, respectively. However, a value that is substituted into a first parameter (i.e., cell selection parameter, cell reselection parameter, or handover parameter) included in the common criterion is varies depending on which one of the normal operation and the ECM-specific operation is performed. For example, a second value that is substituted into the first parameter during the ECM-specific operation may be adjusted so that a cell (or an eNB) that is supporting the ECM can be readily selected as the target for the MTC UE 11 to camp on or to perform handover, compared to a cell (or the eNB) that does not support the ECM.

Figure 3:
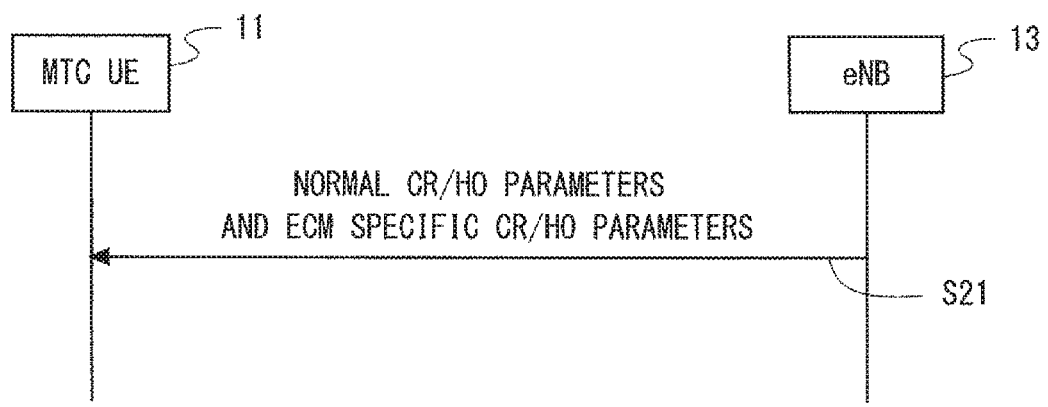
FIG. 3 is a sequence diagram showing one example of operations of the M2M terminal (MTC UE) and a base station (eNB) according to the first embodiment.

As shown in FIG. 3, the eNB 13 may notify the MTC UE 11 of both a first value to be substituted into the first parameter during the normal operation and a second value to be substituted into the first parameter during the ECM-specific operation. In the example shown in FIG. 3, the eNB 13 transmits normal cell-selection parameters (normal cell-reselection (CR) parameters) and normal handover parameters (normal handover (HO) parameters) and further transmits ECM-specific cell-selection parameters (ECM-specific CR parameters) and ECM-specific handover parameters (ECM-specific HO parameters) (Step S21). The MTC UE 11 receives the normal cell-selection and handover parameters and the ECM-specific cell-selection and handover parameters and uses them for the cell selection operation and the handover operation.

The common criterion for the cell selection operations may be a cell selection criterion S (S-criterion) in the LTE. The S-criterion is specified in 3GPP TS 36.304 V9.11.0. In the S-criterion, a UE selects a cell which both Srxlev and Squal exceed 0 dB. The symbols Srxlev and Squal are defined by the following Formulae (1) and (2).

$$Srxlev = Q_{rxlevmeas} - (Q_{rxlevmin} + Q_{rxlevminoffset}) - P_{compensation} \quad (1)$$

$$Squal = Q_{qualmeas} - (Q_{qualmin} + Q_{qualminoffset}) \quad (2)$$

In Formulae (1) and (2), $Q_{rxlevmeas}$ is the measured cell received power level value. $Q_{rxlevmin}$ is the minimum required received power level value in the cell. $Q_{qualmeas}$ is the measured cell received quality value. $Q_{qualmin}$ is the minimum required received quality value in the cell. $Q_{rxlevoffset}$ and $Q_{qualoffset}$ indicate offset parameters to avoid ping-pong in the cell selection. Pcompensation is defined as $\max(P_{EMAX} - P_{powerclass}, 0)$. $P_{EMAX}$ is the maximum transmission power level allowed for a UE in the cell. $P_{powerclass}$ is the maximum transmission power level based on a UE power class. For example, the eNB 13 may vary a value to be substituted into $Q_{rxlevoffset}$, or a value to be substituted into $Q_{qualoffset}$, or both of them depending on which the normal operation or the ECM-specific operation is performed.

The common criterion for the cell reselection operation may be a cell-ranking criterion R (R-criterion) in the LTE. The R-criterion is specified in 3GPP TS 36.304 V9.11.0. In the R-criterion, the UE calculates an R metric of the serving cell (Rs) and an R metric of a neighbouring cell (Rn) according to the following Formulae (3) and (4). $R_s$ and $R_n$ indicate the ranking of the serving cell and that of the neighbouring cell, respectively. The UE selects the highest ranked cell.

$$R_s = Q_{meas,s} + Q_{hyst,s} \quad (3)$$

$$R_n = Q_{meas,n} + Q\text{offset} \quad (4)$$

In Formulae (3) and (4), $Q_{meas,s}$ and $Q_{meas,n}$ are the measured quality of the serving cell and that of the neighbouring cell, respectively. $Q_{hyst,s}$ is a hysteresis parameter applied to the quality of the serving cell. Qoffset is an offset parameter applied to the quality of the neighbouring cell. If the serving cell and the neighbouring cell uses the same frequency (intra-frequency), Qoffset is defined as Qoffset=Qoffset$_{s,n}$. Qoffset$_{s,n}$ is an offset value applied to the combination of the serving cell and the neighbouring cell. On the other hand, if the serving cell and the neighbouring cell use different frequency bands (inter-frequencies), Qoffset is defined as Qoffset=Qoffset$_{s,n}$+Qoffset$_{freqency}$. Qoffset$_{frequency}$ is a frequency-specific offset. For example, the eNB 13 may vary a value to be substituted into $Q_{hyst,s}$, or a value to be substituted into Qoffset, or both of them depending on which the normal operation or the ECM-specific operation is performed.

The common criterion for the handover operation may be a transmission condition of a handover request by the MTC UE 11 or a transmission condition of a measurement report that triggers handover. More specifically, the common criterion for the handover operation may be a measurement report triggering condition for Events A1 to A6 of the LTE. The measurement report triggering condition for Events A1 to A6 is a transmission condition of a measurement report by a UE and is specified in 3GPP TS 36.331 V11.6.0. For example, the essential part of the measurement reporting event defined as the Event A3 (Neighbour becomes offset better than serving) is expressed by the following Formula (5).

$$Mn + Ofn + Ocn - Hys > Ms + Ofs + Ocs + Off \quad (5)$$

In Formula (5), Ms and Mn are the measured quality of the serving cell and that of a neighbouring cell, respectively. Ofs and Ofn are a frequency-specific offset to the serving cell and that to the neighbouring cell, respectively. Ofs and Ofn correspond to "offsetFreq" defined in a measObjectEUTRA information element (IE). Ocs and Ocn are a cell-specific offset to the serving cell and that to the neighbouring cell, respectively. Ocs and Ocn correspond to a "cellIndividualOffset" defined in the measObjectEUTRA information element. Hys is a hysteresis parameter for the Event A3. Hys corresponds to a "hysteresis" defined in a reportConfigEUTRA information element. Off is an offset parameter for the Event A3. Off corresponds to an "a3-Offset" defined in a reportConfigEUTRA information element. For example, the eNB 13 may vary any one of the values to be substituted into Ofs, Ofn, Ocs, Ocn, Hys, and Off depending on which the normal operation or the ECM-specific operation is performed.

Third Example

In the third example, the eNB 13 notifies the MTC UE 11 of one or both of a cell reselection parameter(s) and a handover parameter(s) adjusted according to whether the ECM (i.e., coverage enhancement processing in the ECM) is required for the MTC UE 11. The MTC UE 11 uses one or both of the adjusted cell reselection parameter(s) and the adjusted handover parameter(s), which have been received from the eNB 13, in the ECM-specific cell reselection operation or the ECM-specific handover operation. It should be noted that the third example is different from the above second example in that the MTC UE 11 does not have to receive both the normal first value and the ECM-specific second value for a specific cell-reselection parameter or handover parameter.

For example, if the ECM is required for the MTC UE 11, the eNB 13 may adjust one or both of a cell selection parameter(s) and a handover parameter(s) so that a cell (or an eNB) that is supporting the ECM can be readily selected as the target cell for the MTC UE 11 to camp on or to perform handover, compared to a cell (or an eNB) that does not support the ECM. For example, the eNB 13 may adjust one or both of values to be substituted into $Q_{hyst,s}$ and Qoffset, which are used in the above R-criterion, according to whether the ECM is required for the MTC UE 11. Further, the eNB 13 may adjust any one of the values to be substituted into Ofs, Ofn, Ocs, Ocn, Hys, and Off, which are used for determination of a measurement reporting event (e.g., Event A3), according to whether the ECM is required for the MTC UE 11.

Figure 4:
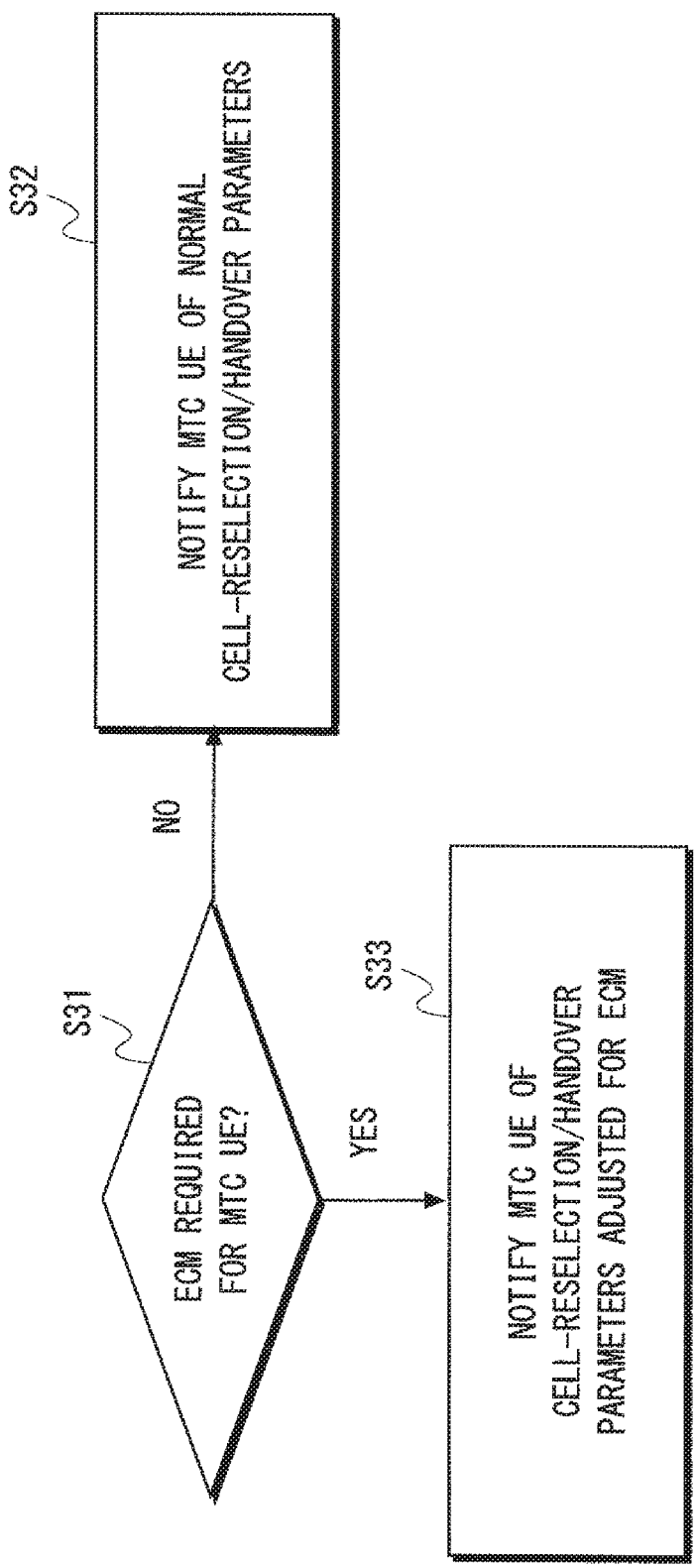
FIG. 4 is a flowchart showing one example of operations of the base station (eNB) according to the first embodiment.

FIG. 4 is a flowchart showing one example of operations of the eNB 13 regarding the third example. In Step S31, the eNB 13 recognizes whether the ECM is required for the MTC UE 11 that has camped on the cell 130. As already stated above, necessity of the ECM (or necessity of executing the ECM) may be determined by the MTC UE 11 or by the eNB 13. The eNB 13 may receive from the MTC UE 11 a notification explicitly or implicitly indicating that the ECM is required or is being executed in the MTC UE 11. When the ECM is not required for the MTC UE 11 (NO in Step S31), the eNB 13 notifies the MTC UE 11 of one or both of the normal cell selection parameter(s) and the normal handover parameter(s) (Step S32). On the other hand, when the ECM is required for the MTC UE 11 (YES in Step S32), the eNB 13 notifies the MTC UE 11 of one or both of the cell selection parameter(s) adjusted for the ECM and the handover parameter(s) adjusted for the ECM (Step S33).

Second Embodiment

A configuration example of a radio communication system according to this embodiment may be the same as that of FIG. 1 described in the first embodiment. In this embodiment, one example of specific procedures regarding the ECM-specific cell reselection operation and the ECM-specific handover operation described in the first embodiment is described.

An MTC UE 21 according to this embodiment receives from the eNBs 23 and 24 a notification indicating whether the ECM is supported by their respective cells. For the sake of convenience, the cell of the eNB 23 is referred to as a first cell (Cell 1) and the cell of the eNB 24 is referred to as a second cell (Cell 2). During the ECM-specific operation (the cell selection operation, the cell reselection operation, or the handover operation), the MTC UE 21 considers whether each of the first and second cells (or the eNBs 23 and 24) is supporting the ECM.

Figure 5:
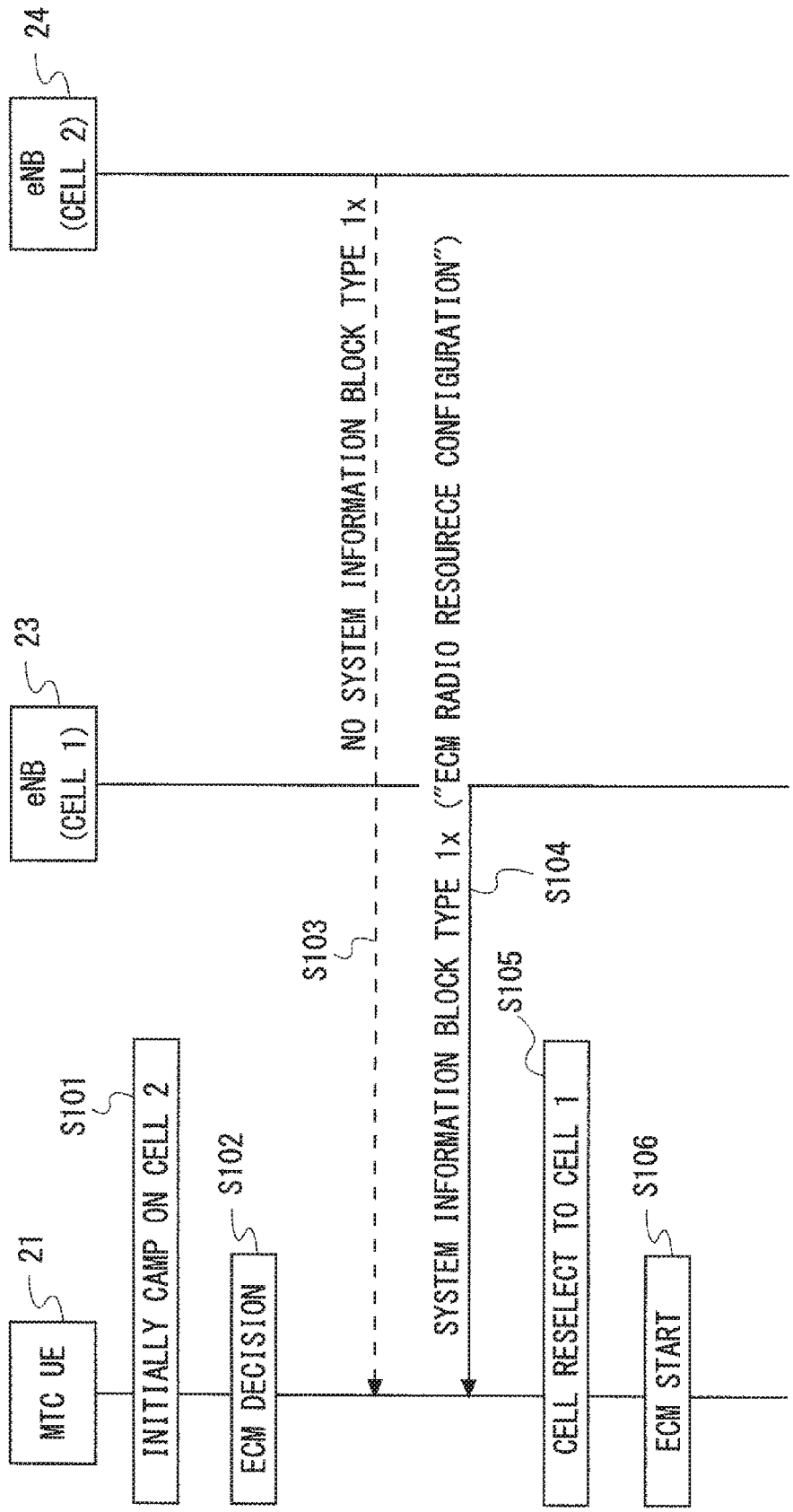
FIG. 5 is a sequence diagram showing one example of communication procedures according to a second embodiment.

FIG. 5 is a sequence diagram showing an example of operations of the MTC UE 21, the eNB 23, and the eNB 24 according to this embodiment. FIG. 5 shows only the messages that are necessary for explanation of this embodiment and some messages included in the procedure specified in the LTE standard are not shown. In the example shown in FIG. 5, the cell of the eNB 23 (Cell 1) supports the ECM, but the cell of the eNB 24 (Cell 2) does not support the ECM. The MTC UE 21 itself determines whether the ECM is required for the MTC UE 21 (or whether to execute the ECM) and preferentially selects a cell that is supporting the ECM (or the eNB that manages the cell) when the MTC UE 21 has decided to execute the ECM.

In Step S101, the MTC UE 21 is in the idle state (RRC_IDLE) as the initial state and decides to camp on the cell of the eNB 24 (second cell (Cell 2)) based on the normal cell selection criterion (Initially camp on Cell 2). In Step S102, the MTC UE 21 determines whether the ECM is required (ECM decision). For example, the MTC UE 21 may perform the determination of Step S102 while the MTC UE 21 is in the idle state (RRC_IDLE). Alternatively, the MTC UE 21 may perform the determination of Step S102 when a periodic or non-periodic communication opportunity (e.g., periodic communication permitted period, occurrence of non-periodic uplink transmission data, or reception of paging) arises.

If the MTC UE 21 determines that the ECM is required in Step S102, the MTC UE 21 checks whether the ECM is supported by the camped cell (i.e., the Cell 2). In Step S103, the MTC UE 21 detects that radio resource configuration information regarding the ECM (ECM radio resource configuration) is not broadcasted in the Cell 2 (No System Information Block Type 1x) and, accordingly, recognizes that the Cell 2 does not support the ECM. The MTC UE 21 then checks whether the ECM is supported by any one of the neighbouring cells (e.g., the Cell 1) (Step S104). The MTC UE 21 detects that radio resource configuration information regarding the ECM is broadcasted in the Cell 1 (System Information Block Type 1x) and, accordingly, recognizes that the Cell 1 is supporting the ECM. In Step S105, the MTC UE 21 reselects the cell of the eNB 23 (Cell 1) and camps on the Cell 1 (Cell reselect to Cell 1). In Step S106, the MTC UE 21 starts executing the ECM (ECM start).

As can be understood from the above description, the MTC UE 21 preferentially selects a cell that is supporting the ECM when the ECM is required for the MTC UE 21. Communication characteristics of the MTC UE 21 are thus improved.

Now, examples of the ECM-specific cell reselection operation in Step S105 in FIG. 5 are described below. When the currently camped cell (Cell 2) does not support the ECM, the MTC UE 21 may select the currently camped cell (Cell 2) or the neighbouring cell (Cell 1) that is supporting the ECM in accordance with one of the following criteria. In one example, if the radio quality of the neighbouring cell supporting the ECM is higher than that of the camped cell (serving cell) by a predetermined offset value, the MTC UE 21 moves to (reselects) the neighbouring cell supporting the ECM. In another example, if the radio quality of the camped cell (serving cell) is smaller than a first predetermined threshold and the radio quality of the neighbouring cell supporting the ECM is larger than a second predetermined threshold, the MTC UE 21 moves to (reselects) the neighbouring cell supporting the ECM.

The aforementioned offset value or the threshold used for the cell reselection, i.e., cell reselection parameter, may be broadcasted by the eNB 23 using the system information (SIB), may be received from the eNB 23 by the MTC UE 21 as dedicated information, or may be pre-configured in the MTC UE 21.

For example, the eNB 23 may transmit the ECM-specific cell-reselection parameter(s) in SIB 1x shown in Step S104. The ECM-specific cell reselection parameter(s) may include, for example, at least one of "cellReselectionInfoCommon" in SIB3, "cellReselectionServingFreqInfo" in SIB3, "intraFreqCellReselectionInfo" in SIB3, "q-QualMin" in SIB3, "threshServingLowQ" in SIB3, "IntraFreqNeighCellInfo" in SIB4, "InterFreqCarrierFreqInfo" in SIB5, and "InterFreqNeighCellInfo" in SIB5. The eNB 23 may transmit both the first value(s) to be substituted into the cell reselection parameter(s) during the normal cell reselection operation and the second value(s) to be substituted into the cell reselection parameter(s) during the ECM-specific cell-reselection operation.

Specific examples of the determination regarding whether the ECM (coverage enhancement processing in the ECM) is required in Step S102 of FIG. 5 are described below. The MTC UE 21 may determine necessity of the ECM (the coverage enhancement processing in the ECM) by considering at least one of access cause, terminal capability (UE capability), terminal information (UE information), communication characteristics (communication performance), and radio quality of the MTC UE 21.

Specific examples of the access cause, terminal capability, terminal information, communication characteristics, and radio quality are described below. However, the contents of the access cause, terminal capability, terminal information, communication characteristics, and radio quality are not limited to them.

The access cause may include at least one of the following two items:
Purpose of establishing an RRC connection (Establishment cause); and
Service type.

The purpose of establishing an RRC connection may specify, for example, (a) an emergency call (emergency), (b) a high priority access (highPriorityAccess), (c) an access for mobile terminated communication (mt-Access), mobile originated signaling (mo-Signalling), (d) terminal originated data transmission (mo-Data), (e) a delay tolerant access (delayTolerantAccess), (f) a low priority access (lowPriorityAccess), (g) an access for small data communication (smallDataAccess), (h) an access for small packet communication (smallPacketAccess), (i) a limited access (limitedAccess), (j) an access for a limited service (limitedService), (k) an M2M-type access (m2mAccess), or (l) an access using the ECM (ecmAccess).

The service type may specify, for example, (a) a real-time service, (b) a non-real-time service, or (c) M2M-type communication.

The terminal capability may include, for example, at least one of the following three items:
Radio access capability;
Device capability; and
Terminal category (UE category).

The radio access capability may include, for example, (a) information indicating whether the UE is supporting the terminal function defined in the 3GPP LTE (e.g., flag bit) or (b) information indicating whether the UE is supporting the ECM. In order to indicate whether the UE is supporting the ECM, an information element (IE) named "EcmSupport" may be defined. For example, the true value of "EcmSupport" indicates that the ECM is supported (Supported) and the false value thereof indicates that the ECM is not supported (NotSupported). Further, an IE named "EnhancedCoverageMode" may be defined. For example, when EcmSupport is set to a value "Supported", it indicates that the UE is supporting the ECM. On the other hand, if the UE does not support the ECM, EcmSupport may be set to a value "NotSupported". Alternatively, no sending of this IE may imply that the UE is not supporting the ECM.

The device capability may include, for example, (a) information indicating that the UE is an MTC UE, (b) information indicating that communication capability of the UE is limited (compared to that of a normal UE), or (c) information indicating that the UE performs only a specific communication (e.g., M2M-type communication).

The terminal category may include, for example, (a) information indicating one of terminal categories defined in the 3GPP LTE or (b) information indicating one of access classes defined in the 3GPP LTE. New terminal category or new access class may be defined for MTC UEs performing M2M-type communication. For example, a new category (e.g., category 0) for MTC UEs whose functions are limited in order to implement it at a low cost may be defined. Further or alternatively, a new access class (AC) that indicates infrequent communication or allows only infrequent communication may be defined.

The terminal information may include at least one of the following three items:
Terminal type (UE type);
Device type; and
Terminal context (UE context).

The terminal type may include, for example, (a) information indicating whether the UE is a normal UE (non-MTC UE) or an MTC UE, (b) information indicating whether the UE has mobility (or information indicating that the UE has no mobility), or (c) information indicating whether there is a power supply for the UE.

The device type may include, for example, (a) information indicating the type of the operating system (OS) installed in the UE or (b) information indicating the type of the M2M-type communication performed by the UE (i.e., sub-category information of the M2M).

The terminal context may include, for example, (a) information on the aforementioned terminal capability, (b) RRC control information configured in the UE (e.g., information contained in a RadioResrouceConfigCommon IE and a RadioResourceConfigDedicated IE), (c) information regarding the mobility of the UE (mobility information), (d) information indicating whether the UE is executing the ECM (ECM execution information), or (e) information indicating whether the UE has executed the ECM before (e.g., when the UE was in RRC_CONNECTED last time) (ECM status information).

The communication characteristic may include, for example, at least one of the following two items:
Performance measurement result (e.g., L2 measurement); and
Statistical communication quality (e.g., KPI).

The performance measurement result may include, for example, (a) measurement results of a block error rate (Block Error Rate), (b) measurement results of a packet error rate (Packet Error Rate), (c) measurement results of throughput (e.g., Scheduled IP Throughput), (d) a measurement results of packet loss (Packet Loss Rate), or (e) measurement results of packet discard (Packet Discard Rate).

The statistical communication quality may include, for example, (a) the number of handover attempts or a handover attempt rate, (b) a handover success rate or a handover failure rate, (c) a communication interval or a communication frequency, (d) a packet occurrence interval or a packet occurrence frequency, (e) a packet arrival interval (packet inter-arrival time) or a packet arrival frequency (packet inter-arrival rate), (f) an access interval or an access frequency, or (g) an interval or a frequency of an RRC connection establishment or a NAS connection establishment.

The radio quality may include, for example, at least one of the following two items:
Received quality of a reference signal (Reference Signal (RS) received quality); and
Channel quality indicator (CQI).

The received quality of a reference signal (RS) may include, for example, received power (RSRP), (b) reception quality (RSRQ), or received power intensity (RSSI) of a downlink RS at the UE.

Further, different operations regarding the ECM (i.e., control of reception or transmission of the MTC UE 21) may be defined for multiple ECM levels. In this case, the MTC UE 21 may determine not only whether the ECM is required (or whether to execute the ECM) but also which operation level is necessary (or which operation level should be executed) and notify the eNB 23 of the determined level. The eNB 23 may allow for the ECM operation level reported from the MTC UE 21 based on the notification sent from the MTC UE 21. Alternatively, the eNB 23 may determine a level different from that reported from the MTC UE 21 and send a notification indicating the determined level to the MTC UE 21. That is, the eNB 23 may have the authority to make a final decision on the ECM operation level that the MTC UE 21 should follow.

Further, when the MTC UE 21 determines to execute the ECM or the eNB 23 determines to apply the ECM to the MTC UE 21, the MTC UE 21 may continue executing the ECM even after transitioning to RRC_IDLE from RRC_CONNECTED. Further, when the MTC UE 21 determines to execute the ECM or the eNB 23 determines to apply the ECM to the MTC UE 21, the MTC UE 21 may continue executing the ECM during a delay tolerant access.

Further, after initial determination of whether the ECM is required (or whether to execute the ECM), the MTC UE 21 may determine whether to continue executing the ECM based on communication characteristics or radio quality of the MTC UE 21. For example, the MTC UE 21 may acquire one or both of a block error rate and a packet error rate as the communication characteristics of the MTC UE 21 and may suspend (or stop) the ECM when it determines that one or both of the block error rate and the packet error rate below a predetermined threshold. Further or alternatively, the MTC UE 21 may acquire one or both of RSRP and RSRQ as the radio quality and may suspend (or stop) the ECM when it determines that one or both of the RSRP and the RSRQ exceed a predetermined threshold.

Third Embodiment

A configuration example of a radio communication system according to this embodiment may be the same as that of FIG. 1 described in the first embodiment. In this embodiment, one example of the specific procedures regarding the ECM-specific cell reselection operation and ECM-specific handover operation described in the first embodiment is described.

In this embodiment, an eNB 33 determines whether the ECM is required for an MTC UE 31, or in other words, whether to allow the MTC UE 31 to execute the ECM. If the MTC UE 33 receives from the eNB 33 an instruction to execute the ECM, the MTC UE 31 executes the ECM-specific cell reselection operation. In this embodiment, the ECM-specific cell reselection operation includes preferentially selecting a cell that is supporting the ECM (or an eNB that manages the cell). More specifically, the ECM-specific cell reselection operation according to this embodiment includes, after the MTC UE 31 has been transitioned to the idle state (RRC_IDLE) from the connected state (RRC_CO-NNECTED), stopping cell reselection to another cell in order to remain in the cell that is supporting the ECM.

Figure 6:
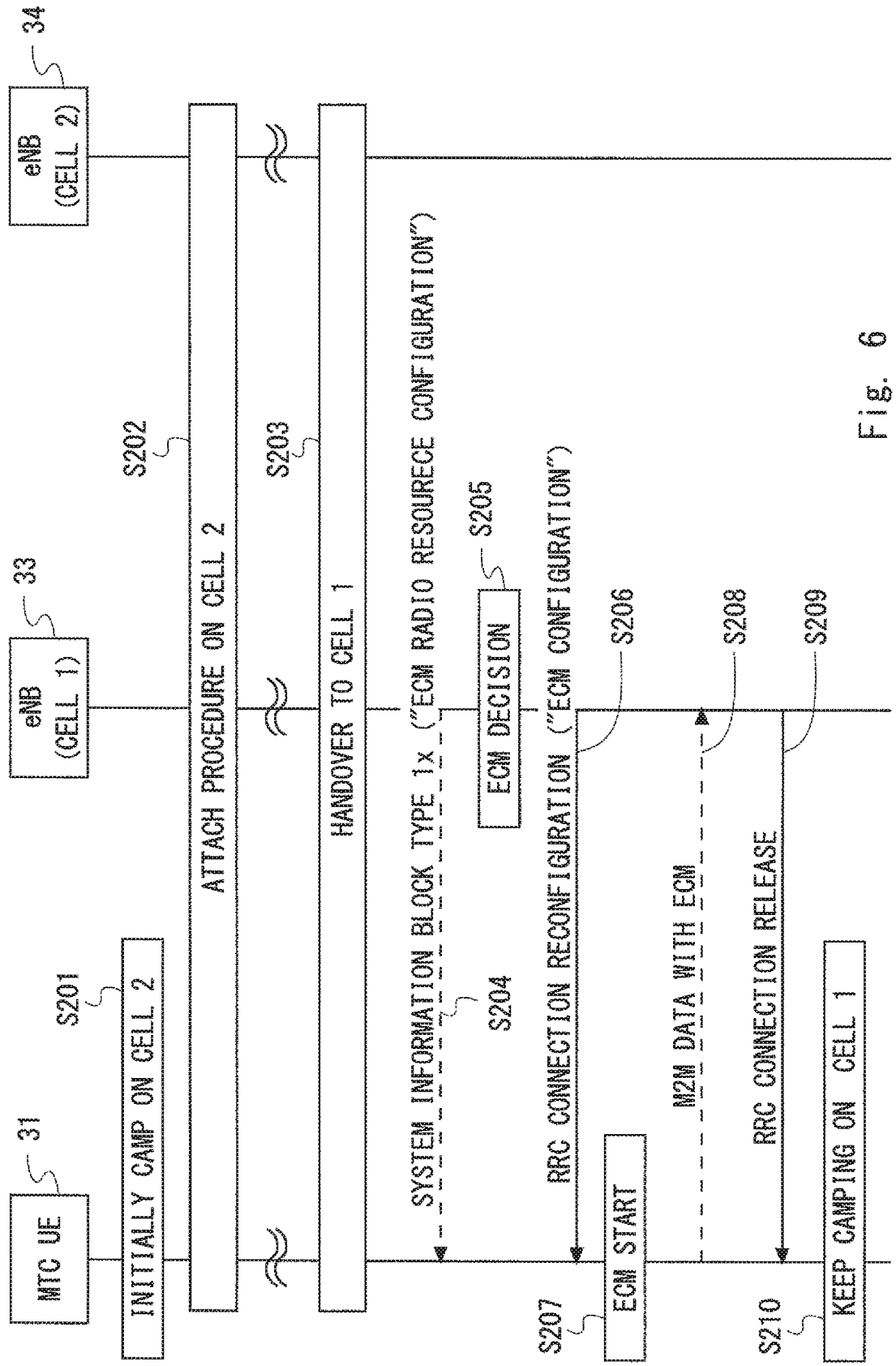
FIG. 6 is a sequence diagram showing one example of communication procedures according to a third embodiment.

FIG. 6 is a sequence diagram showing an example of operations of the MTC UE 31, the eNB 33, and an eNB 34 according to this embodiment. FIG. 6 shows only the messages that are necessary for explanation of this embodiment and some messages included in the procedure specified in the LTE standard are not shown. In the example shown in FIG. 6, the cell of the eNB 33 (Cell 1) supports the ECM, but the cell of the eNB 34 (Cell 2) does not support the ECM.

In Step S201, the MTC UE 31 is in the idle state (RRC_IDLE) as the initial state and decides to camp on the cell of the eNB 34 (second cell (Cell 2)) based on the normal cell selection criterion (Initially camp on Cell 2). In Step S202, the MTC UE 31 transmits and receives messages that are necessary to attach to the network and completes the attach (Attach procedure on Cell 2). In Step S203, the eNB 34 determines that the MTC UE 31 in the connected state (RRC_CONNECTED) should be handed over to the cell of the eNB 33 (Cell 1) and the MTC UE 31 is handed over to the Cell 1. When radio resource configuration information (ECM radio resource config) for the ECM is transmitted as system information in the Cell 1, the MTC UE 31 may receive this system information (Step S204: System Information Block Type 1x).

In Step S205, the eNB 33 determines whether the coverage enhancement processing in the ECM is required for the MTC UE 31, or in other words, whether to cause the MTC UE 31 to execute the ECM (ECM decision). FIG. 6 shows a case in which the ECM is required for the MTC UE 31. Accordingly, in Step S206, the eNB 33 transmits ECM configuration information (ECM configuration) to the MTC UE 31 (RRC Connection Reconfiguration). In Step S206, the eNB 33 may send information that explicitly instructs the MTC UE 21 to execute the ECM.

In Step S207, the MTC UE 31 starts executing the ECM in accordance with the radio resource configuration information and the ECM configuration information (ECM start). In Step S208, the MTC UE 31 performs data communication using the coverage enhancement processing in the ECM (M2M data with ECM).

In Step S209, the eNB 33 transmits to the MTC UE 31 an instruction to cause the MTC UE 31 to transition to the idle state (RRC_IDLE) (RRC Connection Release). In response to this instruction, the MTC UE 31 transitions from the connected state (RRC_CONNECTED) to the idle state (RRC_IDLE). In Step S210, the MTC UE 1 continues to camp on the cell of the eNB 33 (Cell 1) that is supporting the ECM as the ECM-specific cell reselection operation (Keep camping on Cell 1). The MTC UE 31 may continue executing the ECM even after transitioning to RRC_IDLE. Alternatively, the MTC UE 31 may suspend the ECM during RRC_IDLE and may re-start the ECM when the MTC UE 31 is transitioning to RRC_CONNECTED or after the MTC UE 31 has been transitioned to RRC_CONNECTED.

As can be understood from the above description, if the MTC UE 33 is instructed by the eNB 33 that execution of the ECM is necessary, the MTC UE 31 preferentially selects a cell supporting the ECM. Communication characteristics of the MTC UE 31 are thus improved.

Fourth Embodiment

A configuration example of a radio communication system according to this embodiment may be the same as that of FIG. 1 described with reference to the first embodiment. In this embodiment, examples of specific procedures regarding the ECM-specific cell reselection operation and the ECM-specific handover operation described in the first embodiment are described.

In this embodiment, an MTC UE 41 requests the eNB to make arrangements for enable the MTC UE 41 to preferentially camp on an appropriate cell among cells that are supporting the ECM (or the eNBs that manage the ECM). The MTC UE 41 may select at least one cell that is appropriate for the MTC UE 41 to camp on and send to the eNB a cell list indicating at least one appropriate cell.

Figure 7:
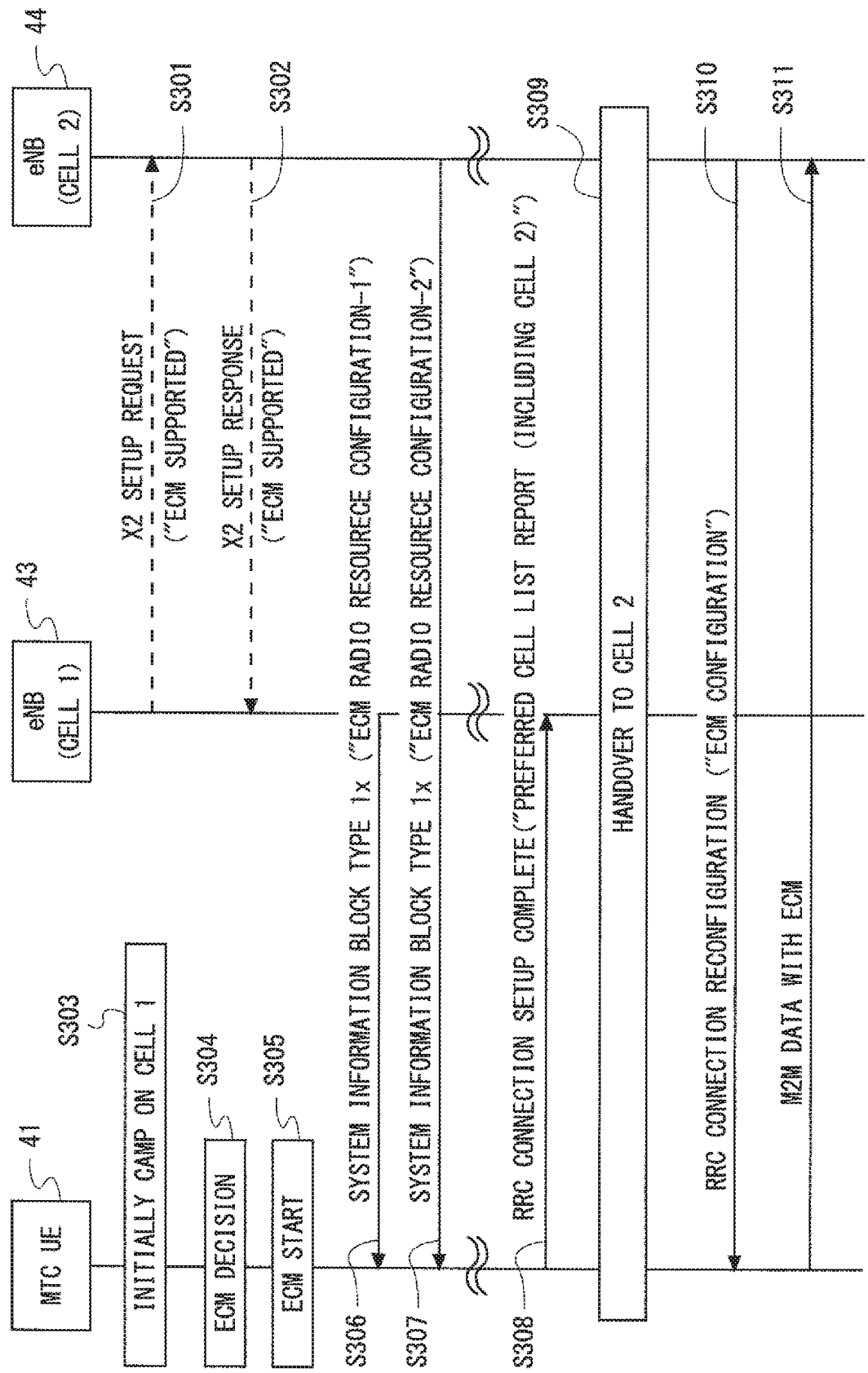
FIG. 7 is a sequence diagram showing one example of communication procedures according to a fourth embodiment.

FIG. 7 is a sequence diagram showing an example of operations of the MTC UE 41, an eNB 43, and an eNB 44 according to this embodiment. FIG. 7 shows only the messages that are necessary for explanation of this embodiment and some messages included in the procedure specified in the LTE standard are not shown. In the example shown in FIG. 7, both the cell of the eNB 43 (Cell 1) and the cell of the eNB 44 (Cell 2) support the ECM. The MTC UE 41 itself determines whether the ECM is required for the MTC UE 41 (or whether to execute the ECM).

In Step S301, the eNB 43 sends to the eNB 44 (X2 Setup Request) a request to establish a direct interface (X2 interface). In Step S302, the eNB 44 sends a response regarding the establishment of X2 interface to the eNB 43 (X2 Setup Response). The messages transmitted in Steps S301 and S302 may contain information indicating that the ECM is being supported (e.g., ECM supported). The information indicates support of the ECM on a per-eNB basis or on a per-cell basis (i.e., a per serving-cell basis).

In Step S303, the MTC UE 41 is in the idle state (RRC_IDLE) as the initial state and decides to camp on the cell of the eNB 43 (the first cell (Cell 1)) based on the normal cell selection criterion (Initially camp on Cell 1). In Step S304, the MTC UE 41 determines whether it is required to execute the ECM (ECM decision). FIG. 6 shows a case in which the ECM is required for the MTC UE 41. Accordingly, in Step S305, the MTC UE 41 starts executing the ECM (ECM start). If radio resource configuration information (ECM radio resource configuration-1) for the ECM is transmitted on the system information in the cell of the eNB 43 (Cell 1) in which the MTC UE 41 has camped on, the MTC UE 41 receives this information in Step S306 (System Information Block Type 1x).

In Step S307, the MTC UE 41 checks whether the ECM is supported by any one of the neighbouring cells (e.g., the cell of the eNB 44 (Cell 2)). If radio resource configuration information (ECM radio resource configuration-1) for the ECM is transmitted on the system information in the cell of the eNB 44 (Cell 2), the MTC UE 41 may receive this information (System Information Block Type 1x). Alternatively, the eNB 43 may add information regarding whether the ECM is supported to the list of neighbouring cells (Neighbour Cell List (NCL)) to be transmitted to the MTC UE 41. In this case, the MTC UE 41 can confirm whether each neighbouring cell is supporting the ECM by referring to the list of the neighbouring cells received from the eNB 43.

The MTC UE 41 determines whether there is an appropriate (preferable) cell other than the current serving cell (i.e., the cell of the eNB 43 (Cell 1)) for communication using the ECM. If there is one or more appropriate cells, the MTC UE 41 sends to the eNB 43 a list of cells that are preferable for the MTC UE 41 to camp on (Preferred Cell List) using a message indicating completion of the radio connection (RRC connection) establishment (Step S308:

RRC Connection Setup Complete). The list of cells preferable for the MTC UE 41 to camp on (Preferred Cell List) may indicates a cell identifier (PCI or ECGI) or frequency information (EUTRA Absolute Radio Frequency Channel Number (EARFCN)) to identify each cell. Further, the list of cells may indicate radio quality (RSRP or RSRQ) of each cell. The MTC UE 41 may send the list of cells to the eNB 43 using a message for requesting establishment of a radio connection (RRC Connection Request).

The eNB 43 receives the cell list (Preferred Cell List) from the MTC UE 41 and determines whether to perform handover of the MTC UE 41 to one of the appropriate cells reported by the MTC UE 41. FIG. 7 shows a case in which handover to the cell of the eNB 44 (Cell 2) is determined. Accordingly, in Step S309, the eNB 43 exchanges signals with both the eNB 44 and the MTC UE 41 and executes handover of the MTC UE 41 (Handover to Cell2). During the handover procedure in Step S309, the serving eNB 43 may send, to the target eNB 44, information indicating that the MTC UE 41 is executing the ECM (ECM activated).

In Step S310, the eNB 44 transmits the ECM configuration information (ECM configuration) to the MTC UE 41 (RRC Connection Reconfiguration). In place of Step S310, during the handover procedure shown in Step S309, the eNB 44 may send to the eNB 43 radio resource configuration information (Radio resource configuration) regarding the Cell 2 containing the ECM configuration information (ECM configuration), which is called a Handover Command. In this case, the MTC UE 41 receives the ECM configuration regarding the Cell 2 of the eNB 44 via the eNB 43.

In Step S311, the MTC UE 41 performs data communication using the coverage enhancement processing in the ECM (M2M data with ECM) in accordance with the radio resource configuration information and the ECM configuration information.

As can be understood from the above description, the MTC UE 41 notifies the serving eNB 43 of one or more cells supporting the ECM that are preferable for the MTC UE 41 to camp on. The eNB 43 then executes handover to allow the MTC UE 41 to camp on a cell preferable for the MTC UE 41. It is thus expected that communication characteristics of the MTC UE 41 will be improved.

Next, effective operations for Step S309 of FIG. 7 to allow the MTC UE 41 to be handed over to one of appropriate cells reported by the MTC UE 41 are described below. The eNB 43 may adjust an offset value or a threshold (i.e., handover parameter(s)) applied to a reporting condition (e.g., Event A3 or A5) of the radio quality measurement report (Measurement report) to an ECM-specific value. The ECM-specific handover parameter(s) may include, for example, at least one of offset values (e.g., a3-offset) and thresholds (e.g., a1-Threshold) in various events (Events A1-A6) contained in a ReportConfigEUTRA information element (IE) and offset values (e.g., offsetFreq and cellIndividualOffset) contained in a MeasObjectEUTRA information element (IE). The eNB 43 may transmit a first value and a second value which are substituted into a handover parameter during the normal handover operation and during the ECM-specific handover operation, respectively. The MTC UE 41 may send the radio quality measurement report (Measurement report) based on the ECM-specific handover parameter (the second value) when executing the ECM.

Figure 8:
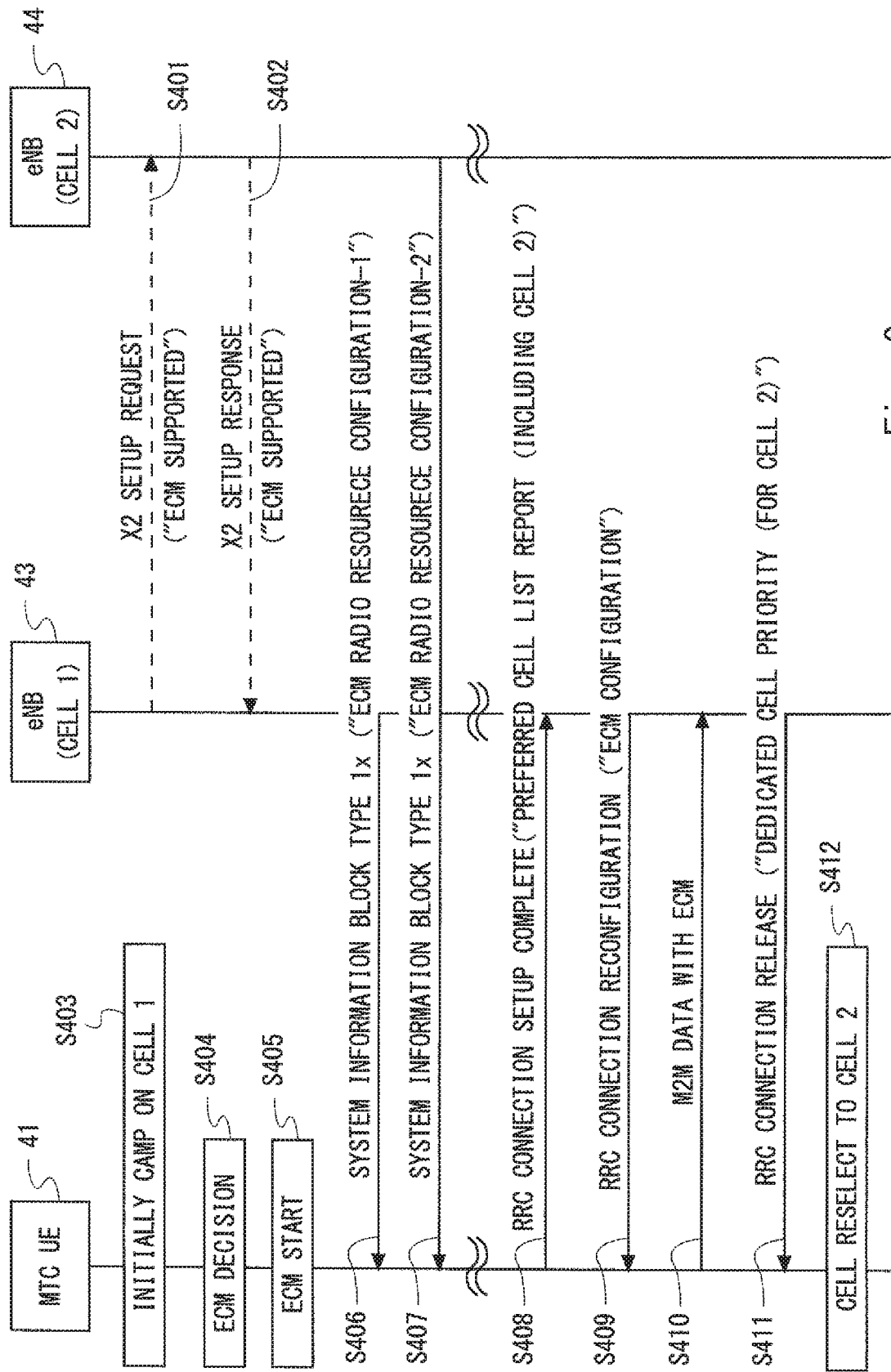
FIG. 8 is a sequence diagram showing another example of the communication procedures according to the fourth embodiment.

FIG. 8 is a sequence diagram showing another example of the operations of the MTC UE 41, the eNB 43, and the eNB 44 according to this embodiment. In the above example shown in FIG. 7, the eNB 43 initiates handover of the MTC UE 41 in order to allow the MTC UE 41 to camp on an appropriate cell reported by the MTC UE 41. On the other hand, in the example shown in FIG. 8, the eNB 43 uses the cell reselection operation performed by the MTC UE 41 to allow the MTC UE 41 to camp on an appropriate cell reported by the MTC UE 41. FIG. 8 shows only the messages that are necessary for explanation of this embodiment and some messages included in the procedure specified in the LTE standard are not shown. In the example shown in FIG. 8, both the cell of the eNB 43 (Cell 1) and the cell of the eNB 44 (Cell 2) support the ECM.

The processes in Steps S401 to S408 in FIG. 8 are similar to those in Steps S301 to S308 in FIG. 7. In Step S409, the eNB 43 transmits ECM configuration information (ECM configuration) to the MTC UE 41 (RRC Connection Reconfiguration). In Step S410, the MTC UE 41 performs data communication using the coverage enhancement processing in the ECM in accordance with the radio resource configuration information and the ECM configuration information (M2M data with ECM).

In Step S411, the eNB 43 transmits an instruction to release the radio connection (RRC connection) to the MTC UE 41 (RRC Connection Release). The instruction transmitted in Step S411 may contain information regarding priority of one or more other cells (e.g., the cell of the eNB 44 (Cell 2)) supporting the ECM that are preferable for the MTC UE 42 to camp on (e.g., Dedicated cell priority for Cell 2). The information regarding the priority may be, for example, information indicating that the MTC UE 41 preferentially selects a specific cell or frequency at cell reselection or may be information indicating that the MTC UE 41 definitely selects a specific cell or frequency. Alternatively, the information regarding the priority may indicate a cell reselection parameters applied to a specific cell or frequency. Further, the information regarding the priority may be selectively used under a specific situation such as a case in which the MTC UE 41 is executing the ECM, a case in which the MTC UE 41 camps on the cell that is supporting the ECM, or a case in which the MTC UE 41 camps on the cell that does not support the ECM.

In Step S412, the MTC UE 41 performs cell reselection in the idle state (RRC_IDLE) and changes the camped cell to the cell of the eNB 44 (Cell 2) (Cell reselect to Cell 2).

As can be understood from the above description, the MTC UE 41 notifies the serving eNB 43 of one or more cells supporting the ECM that are preferable for the MTC UE 41. The eNB 43 then controls the cell reselection operation of the MTC UE 41 in order to cause the MTC UE 41 to camp on any one of the cells that are preferable for the MTC UE 41. Accordingly, it is expected that communication characteristics of the MTC UE 41 will be improved.

Fifth Embodiment

A configuration example of a radio communication system according to this embodiment may be the same as that of FIG. 1 described regarding the first embodiment. In this embodiment, examples of specific procedures of the ECM-specific cell reselection operation and the ECM-specific handover operation described in the first embodiment are described.

In this embodiment, when executing the ECM, an MTC UE 51 changes the cell in which the MTC UE 51 camps on between the case in which the MTC UE 51 is in the idle state (RRC_IDLE) and the case in which the MTC UE 51 is in the connected state (RRC_CONNECTED).

Figure 9:
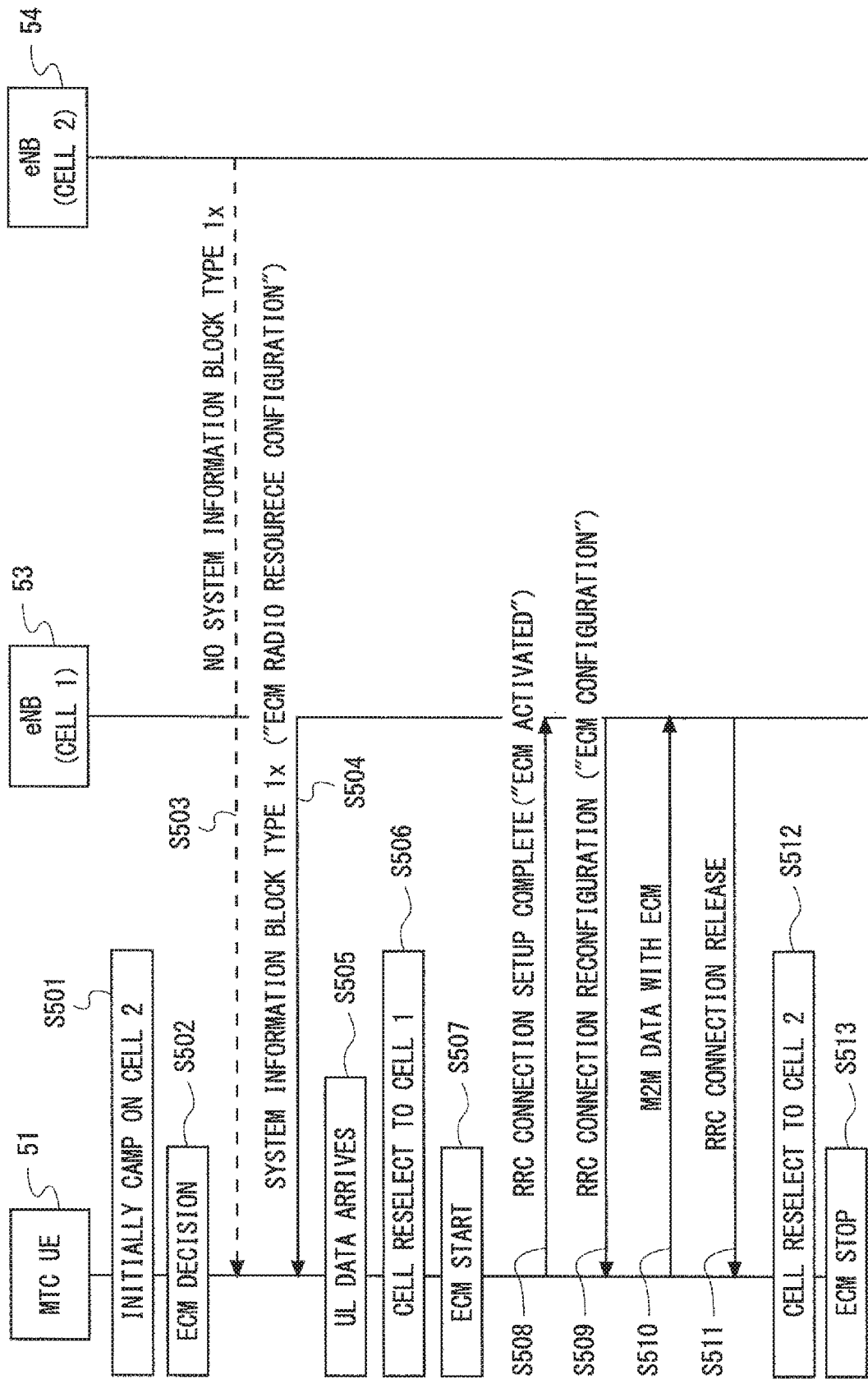
FIG. 9 is a sequence diagram showing one example of communication procedures according to a fifth embodiment.

FIG. 9 is a sequence diagram showing one example of operations of the MTC UE 51, an eNB 53, and an eNB 54 according to this embodiment. FIG. 9 shows only the messages that are necessary for explanation of this embodiment and some messages included in the procedure specified in the LTE standard are not shown. In the example shown in FIG. 9, the cell of the eNB 53 (Cell 1) supports the ECM, but the cell of the eNB 54 (Cell 2) does not support the ECM. The MTC UE 51 itself determines whether the ECM is required for the MTC UE 51 (or whether to execute the ECM). When the MTC UE 51 has decided to execute the ECM and the MTC UE 51 is in the connected state (RRC_CONNECTED), the MTC UE 51 preferentially selects a cell that is supporting the ECM (or the eNB that manages the cell).

In Step S501, the MTC UE 51 is in the idle state (RRC_IDLE) as the initial state and decides to camp on the cell of the eNB 54 (second cell (Cell2)) based on the normal cell selection criterion (Initially camp on Cell 2). In Step S502, the MTC UE 51 determines whether the ECM is required (ECM decision). In the example shown in FIG. 9, the MTC UE 51 performs determination of Step S502 while the MTC UE 51 is in the idle state (RRC_IDLE). Alternatively, the MTC UE 51 may perform the determination of Step S502 when a periodic or non-periodic communication opportunity (e.g., periodic communication permitted period, occurrence of non-periodic uplink transmission data, or reception of paging) arises.

If the MTC UE 51 determines that the ECM is required in Step S502, the MTC UE 51 checks whether the ECM is supported by the camped cell (i.e., the Cell 2). In Step S503, the MTC UE 51 detects that radio resource configuration information regarding the ECM (ECM radio resource configuration) is not broadcasted in the Cell 2 (No System Information Block Type 1x) and, accordingly, recognizes that the Cell 2 does not support the ECM. The MTC UE 51 then checks whether the ECM is supported by any one of the neighbouring cells (e.g., the Cell 1) (Step S504).

In Step S505, uplink data to be transmitted occurs. In other words, uplink data to be transmitted arrives at the MTC UE 51 (UL data arrives). In response to the occurrence of the uplink data, in Step S506, the MTC UE 51 reselects the Cell 1 that is supporting the ECM (or another cell that is supporting the ECM). In Step S507, the MTC UE 51 starts executing the ECM. Step S505 may be a transmission opportunity other than the occurrence of the uplink data (e.g., arrival of a periodic communication permitted period or reception of paging).

In Step S508, the MTC UE 51 transmits and receives messages for establishing a radio connection (RRC connection) to and from the eNB 53 and lastly transmits a completion message indicating completion of the establishment of the radio connection (RRC Connection Setup Complete). The completion message shown in Step S508 may contain information indicating that the MTC UE 51 is executing the ECM (e.g., ECM activated).

In Step S509, the eNB 53 transmits ECM configuration information (ECM configuration) to the MTC UE 51 (RRC Connection Reconfiguration) in response to receiving the completion message in Step S508 indicating that the MTC UE 51 is executing the ECM. In Step S510, the MTC UE 51 performs data communication using the coverage enhancement processing in the ECM in accordance with the radio resource configuration information and the ECM configuration information (M2M data with ECM). Prior to the transmission of the ECM configuration information (ECM configuration) in Step S509, the eNB 53 may determine whether the ECM is actually required for the MTC UE 51. That is, the eNB 53 may check the validity by the MTC UE 51 of necessity of the ECM and reject an inappropriate determination by the MTC UE 51.

In Step S511, the eNB 53 transmits to the MTC UE 51 an instruction to release the radio connection (RRC connection) to cause the MTC UE 51 to transition to the idle state (RRC_IDLE) (RRC Connection Release). In Step S512, the MTC UE 51 transitions to the idle state (RRC_IDLE) and reselects the cell of the eNB 54 (Cell 2) (Cell reselect to Cell 2). In Step S513, the MTC UE 51 suspends (or stops) the execution of the ECM (ECM stop).

The MTC UE 51 may not start the ECM in Step S507 and may start the ECM after receiving the ECM configuration information (ECM configuration) in Step S509. In this case, the completion message in Step S508 may contain a notification indicating that the ECM is required (e.g., ECM request).

As can be understood from the above description, when the ECM needs to be executed and the MTC UE 51 is in the connected state (RRC_CONNECTED), the MTC UE 51 reselects a cell that is supporting the ECM. Accordingly, communication characteristics of the MTC UE 51 in the connected state, in particular, are improved.

Figure 10:
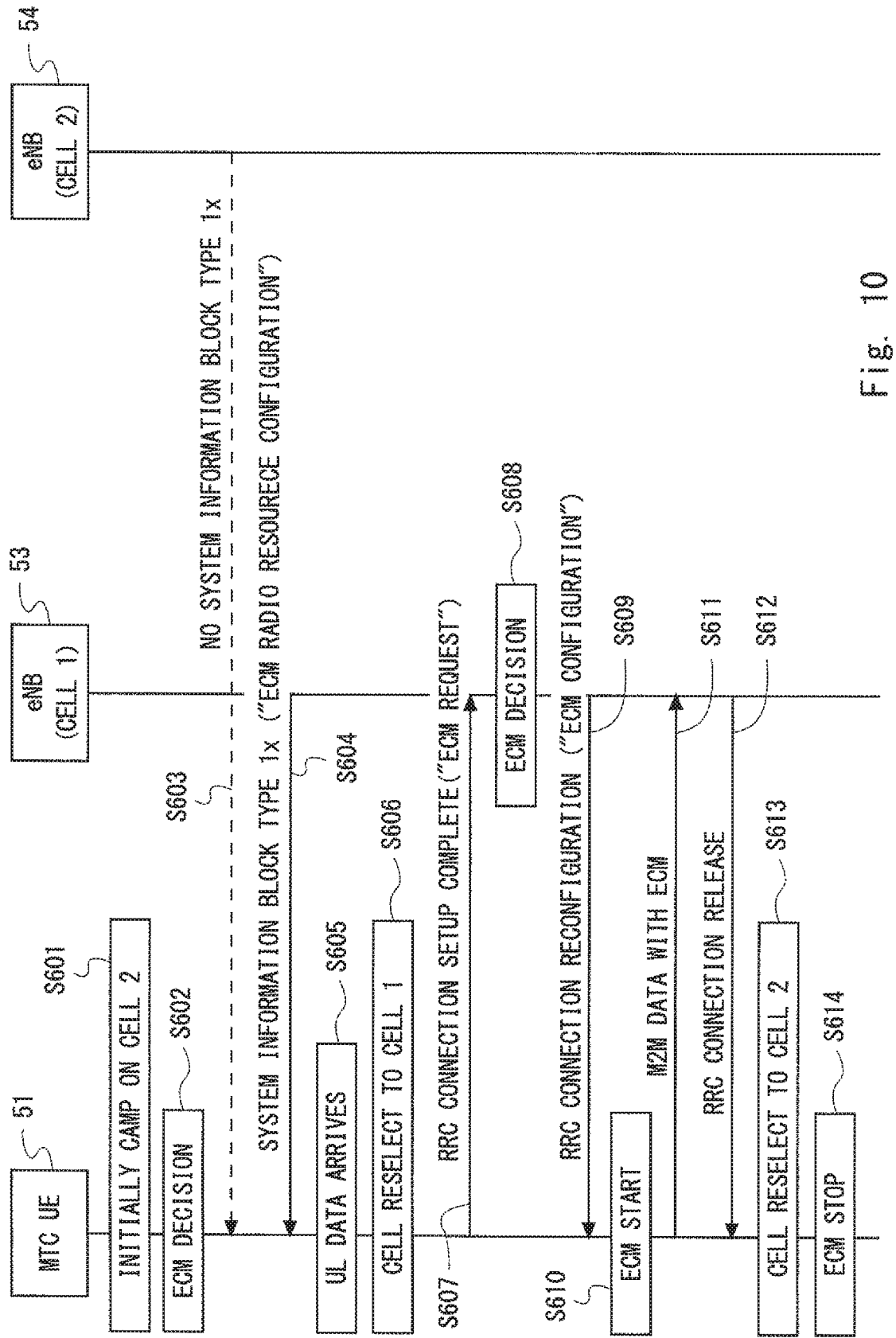
FIG. 10 is a sequence diagram showing another example of the communication procedures according to the fifth embodiment.

FIG. 10 is a sequence diagram showing another example of the operations of the MTC UE 51, the eNB 53, and the eNB 54 according to this embodiment. In the above example shown in FIG. 9, the MTC UE 51 itself determines whether the ECM is required for the MTC UE 51. On the other hand, in the example shown in FIG. 10, the eNB 53 determines whether the ECM is required for the MTC UE 51. FIG. 10 shows only the messages that are necessary for explanation of this embodiment and some messages included in the procedure specified in the LTE standard are not shown. In the example shown in FIG. 10, the cell of the eNB 53 (Cell 1) supports the ECM, but the cell of the eNB 54 (Cell 2) does not support the ECM.

The processes in Steps S601 to S606 of FIG. 10 are similar to those in Steps S501 to S506 of FIG. 9. In Step S607, the MTC UE 51 transmits and receives messages for establishing a radio connection (RRC connection) to and from the eNB 53 and lastly transmits a completion message indicating completion of the establishment of the radio connection (RRC Connection Setup Complete). The completion message transmitted in Step S607 may also contain a notification indicating that the ECM is required for the MTC UE 51 (e.g., ECM request).

In Step S608, the eNB 53 determines whether the ECM is required for the MTC UE 51 (or whether to cause the MTC UE 51 to execute the ECM) (ECM decision). FIG. 10 shows a case in which the ECM is required for the MTC UE 51. Accordingly, in Step S609, the eNB 53 transmits ECM configuration information (ECM configuration) to the MTC UE 51 (RRC Connection Reconfiguration).

In Step S610, the MTC UE 51 starts executing the ECM in accordance with the radio resource configuration information and the ECM configuration information (ECM start). In Step S611, the MTC UE 51 performs data communication using the coverage enhancement processing in the ECM (M2M data with ECM).

In Step S612, the eNB 53 transmits to the MTC UE 51 an instruction to release the radio connection (RRC connection) to cause the MTC UE 51 to transition to the idle state (RRC_IDLE) (RRC Connection Release). In Step S613, the MTC UE 51 transitions to the idle state (RRC_IDLE) and reselects the cell of the eNB 54 (Cell 2) (Cell reselect to Cell 2). In Step S614, the MTC UE 51 suspends (or stops) the execution of the ECM (ECM stop).

According to the procedure shown in FIG. 10, similar to the procedure shown in FIG. 9, when the ECM needs to be executed and the MTC UE 51 is in the connected state (RRC_CONNECTED), the MTC UE 51 reselects a cell that is supporting the ECM. Accordingly, communication characteristics of the MTC UE 51 in the connected state, in particular, are improved.

Sixth Embodiment

A configuration example of a radio communication system according to this embodiment may be the same as that of FIG. 1 described in the first embodiment. In this embodiment, an example of specific procedures of the ECM-specific cell reselection operation and the ECM-specific handover operation described in the first embodiment is described.

In this embodiment, an MTC UE 61 changes at least one of the cell selection operation, the cell reselection operation, and the handover operation according to whether the ECM is supported by at least one of the cell which the MTC UE 61 camps on (serving cell) (e.g., the cell of an eNB 63) and one of its neighbouring cells. That is, in this embodiment, determining by the MTC UE 61 or the eNB (eNB 64 or 65) that the ECM is required for the MTC UE 61 is not necessary to change at least one of the cell selection operation, the cell reselection operation, and the handover operation by the MTC UE 61.

Figure 11:
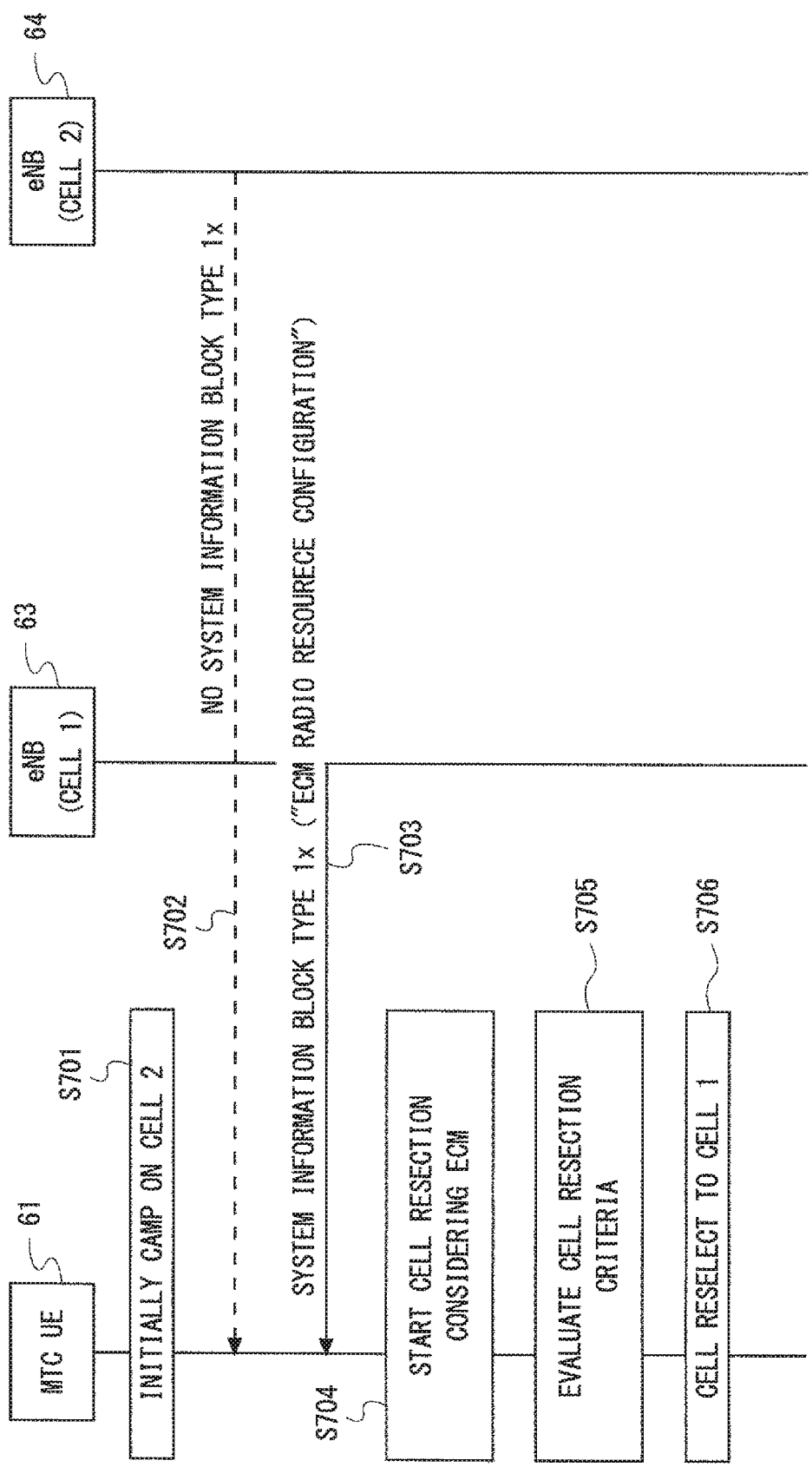
FIG. 11 is a sequence diagram showing another example of communication procedures according to a sixth embodiment.

FIG. 11 is a sequence diagram showing one example of operations of the MTC UE 61, the eNB 63, and the eNB 64 according to this embodiment. FIG. 11 shows only the messages that are necessary for explanation of this embodiment and some messages included in the procedure specified in the LTE standard are not shown. In the example shown in FIG. 11, the cell of the eNB 63 (Cell 1) supports the ECM, but the cell of the eNB 64 (Cell 2) does not support the ECM.

In Step S701, the MTC UE 61 is in the idle state (RRC_IDLE) as the initial state and determines to camp on the cell of the eNB 64 (second cell (Cell 2)) based on the normal cell selection criterion (Initially camp on Cell 2).

In Step S702, the MTC UE 61 checks whether the ECM is supported by the camped cell (the cell of the eNB 64 (Cell 2)). The MTC UE 61 detects that radio resource configuration information regarding the ECM (ECM radio resource configuration) is not broadcasted in the Cell 2 (No System Information Block Type 1x) and, accordingly, recognizes that the Cell 2 does not support the ECM. In Step S703, the MTC UE 61 checks whether the ECM is supported by any one of the neighbouring cells (e.g., the cell of the eNB 63 (Cell 1)). The MTC UE 61 detects that radio resource configuration information regarding the ECM is broadcasted in the Cell 1 (System Information Block Type 1x) and, accordingly, recognizes that the Cell 1 is supporting the ECM.

In Step S704, the MTC UE 61 starts the cell reselection operation with consideration of the ECM (ECM-specific cell reselection operation) in response to the recognition of the neighbouring cell (Cell 1) supporting the ECM. In Step S705, the MTC UE 61 evaluates the cell reselection criterion. The ECM-specific cell reselection operation performed in Steps S704 and S705 may be one of the first to third examples described in the first embodiment. In Step S706, as a result of the ECM-specific cell reselection operation, the MTC UE 61 reselects the cell of the eNB 63 (Cell 1).

As can be understood from the above description, the MTC UE 61 performs at least one of the ECM-specific cell selection operation, the ECM-specific cell reselection operation, and the ECM-specific handover operation when the ECM is supported by at least one of the camped cell and one of its neighbouring cells. It is expected that it is advantageous for the ECM-supporting MTC UE 61 to camp on a cell that is supporting the ECM regardless of whether or not execution of the ECM is actually necessary. This is because it is possible to immediately start the ECM when radio quality or communication characteristics of the MTC UE 61 are degraded. The operation described in this embodiment can contribute to enable the MTC UE 61 to camp on an appropriate cell (e.g., the cell that is supporting the ECM).

Lastly, configuration examples of the MTC UEs and the eNBs according to the above embodiments are described below. Each of the MTC UEs 11, 21, 31, 41, 51, and 61 described in the first to sixth embodiments may include a transceiver to communicate with a eNB and a controller that is coupled to the transceiver. The controller executes the communication control regarding the ECM performed by the MTC UE 11, 21, 31, 41, 51, or 61 described in the first to fifth embodiments.

Each of the eNBs 13, 14, 23, 24, 33, 34, 43, 44, 53, 54, 63, and 64 described in the first to sixth embodiments may include a transceiver to communicate with UEs including MTC UEs and a controller that is coupled to the transceiver. The controller executes the communication control regarding the ECM performed by the eNB 13, 14, 23, 24, 33, 34, 43, 44, 53, 54, 63, or 64 described in the first to fourth embodiments.

Figure 12:
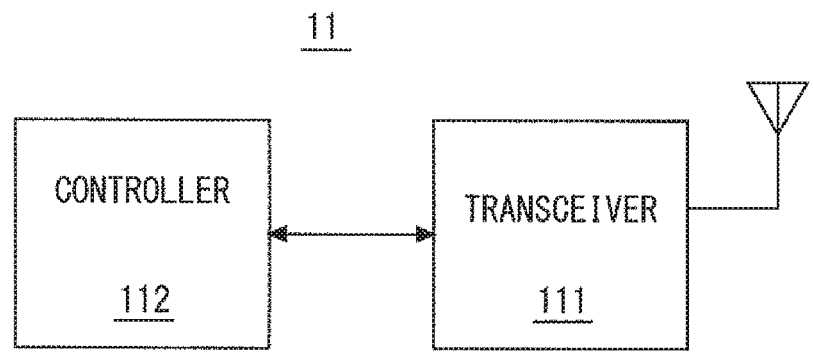
FIG. 12 is a block diagram showing a configuration example of an M2M terminal (MTC UE) according to embodiments of the present invention.
Figure 13:
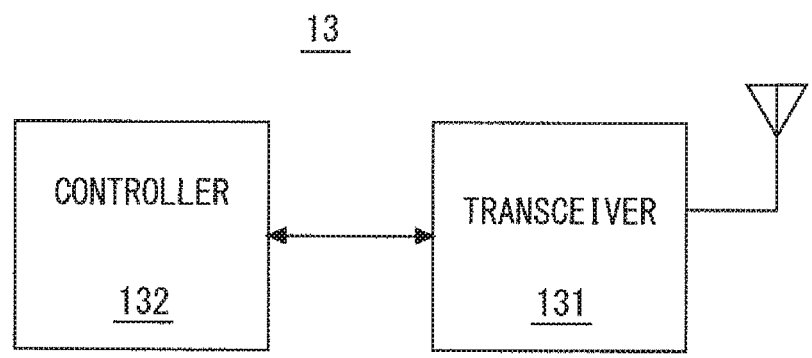
FIG. 13 is a block diagram showing a configuration example of a base station (eNB) according to embodiments of the present invention.

FIGS. 12 and 13 are block diagrams respectively showing configuration examples of the MTC UE 11 and the eNB 13 according to the first embodiment. With reference to FIG. 12, the MTC UE 11 includes a transceiver 111 and a controller 112. The transceiver 111 is configured to communicate with the eNB 13. The controller 112 is configured to control execution of the coverage enhancement processing regarding the ECM in the MTC UE 11 in accordance with instructions from the eNB 13. Specifically, the controller 112 is configured to change at least one of a cell selection operation, a cell reselection operation, and a handover operation according to whether the ECM (coverage enhancement processing in the ECM) is required for the MTC UE 11.

With reference to FIG. 13, the eNB 13 includes a transceiver 131 and a controller 132. The transceiver 131 is configured to communicate with UEs including the MTC UEs 11 and the normal UE 12. The controller 132 is configured to control communication between the MTC UEs 11 and the eNB 13 using the coverage enhancement processing regarding the ECM. Specifically, the controller 132 is configured to assist each MTC UE 11 so that at least one of a cell selection operation, a cell reselection operation, and a handover operation performed by the MTC UE 11 is changed according to whether the ECM is required for the MTC UE 11.

The controllers included in the MTC UEs and the eNBs according to the above embodiments may be implemented by causing a computer including at least one processor (e.g., microprocessor, Micro Processing Unit (MPU), Central Processing Unit (CPU)) to execute a program. Specifically, one or more programs containing set of instructions that causes a computer to perform algorithms regarding the MTC UE or the eNB described using the sequence diagrams and the like may be supplied to the computer.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The explanations of the aforementioned embodiments have been provided with regard to the situation in which MTC UEs are configured with the special operation mode, i.e., the Enhanced Coverage Mode (ECM) and perform the coverage enhancement processing (e.g., RACH repetition and PDSCH/PUSCH repetition) regarding the ECM. However, the MTC UEs is only required to execute the special coverage enhancement processing (e.g., RACH repetition and PDSCH/PUSCH repetition) and do not have to be configured with the special operation mode (i.e., ECM). In other words, the MTC UEs 11, 21, 31, 41, and 51 may execute the special coverage enhancement processing (e.g., RACH repetition and PDSCH/PUSCH repetition) in accordance with the radio resource configuration without setting the special operation mode such as the ECM or without receiving an instruction regarding the special operation mode.

The explanations of the above embodiments have been provided with regard to the ECM, however the technical ideas described in these embodiments may be applied to a case in which a radio network (e.g., eNB) causes M2M terminals (MTC UEs) to execute special processing other than the ECM.

Further, the terms "normal terminals (UE)" and "M2M terminals (MTC UEs)" used in the above explanation are also referred to as "user terminals" and "non-user terminals", respectively.

Further, in the above embodiments, the LTE system has been mainly described. However, these embodiments may be applied to radio communication systems other than the LTE system (e.g., 3GPP UMTS, 3GPP2 CDMA2000 system (1×RTT, HRPD), GSM/GPRS system, or WiMAX system).

When the aforementioned embodiments are applied to 3GPP UMTS, the operations of the eNB (eNB 13, 23, 33, or 43) according to the embodiments may be performed by a NodeB, an RNC or the combination thereof. In other words, the term "base station" used in the specification and claims means one or more entities installed in a radio access network, for example, any one or combination of a NodeB and an RNC in the UMTS.

Further, the above embodiments are merely examples of applications of the technical ideas obtained by the present inventor. Needless to say, these technical ideas are not limited to the above embodiments and the above embodiments may be modified in various ways.

This application is based upon and claims the benefit of priority from Japanese Patent Application No. 2014-015867, filed on Jan. 30, 2014, the disclosure of which is incorporated herein in its entirety by reference.

REFERENCE SIGNS LIST 11, 21, 31, 41 M2M TERMINAL (MTC UE)
13, 14, 23, 24, 33, 34, 43, 44 BASE STATION (eNB)
15 CORE NETWORK (EPC)
130 CELL
140 CELL
111 TRANSCEIVER
112 CONTROLLER
131 TRANSCEIVER
132 CONTROLLER

The invention claimed is:

1. A User Equipment (UE) comprising:
a memory; and
at least one hardware processor coupled to the memory, wherein the at least one hardware processor is configured to:
receive a first system information block comprising a first cell selection parameter for enhanced coverage and a second cell selection parameter for normal coverage;
receive a second system information block comprising a first cell reselection parameter for enhanced coverage and a second cell reselection parameter for normal coverage,
wherein the second system information block is one of a system information block type 3 and a system information block type 5;
wherein the first cell selection parameter for enhanced coverage is specific to enhanced coverage, and is applied to at least one of a first numerical formula defining a cell selection criterion S and a second numerical formula defining the cell selection criterion S, in a case in which the UE is in the enhanced coverage;
wherein the second cell reselection parameter for normal coverage is applied to at least one of the first numerical formula defining the cell selection criterion S and the second numerical formula defining the cell selection criterion S, in a case in which the UE is in the normal coverage; and
wherein the first numerical formula derives a value Srxlev based on at least a measured cell received power value $Q_{rxlevmeas}$, and a minimum required received power level value $Q_{rxlevmin}$, and the second numerical formula derives a value Squal based on at least a measured cell quality value $Q_{qualmeas}$, and a minimum required quality level value $Q_{qualmin}$.

2. The UE according to claim 1, wherein the at least one hardware processor is further configured to: determine whether the UE is in the enhanced coverage based on a measured cell received power and a measured cell quality.

3. The UE according to claim 1, wherein the at least one hardware processor is further configured to: consider that the UE is in the enhanced coverage based on the cell selection criterion S for enhanced coverage being fulfilled.

4. The UE according to claim 1, wherein the at least one hardware processor is further configured to: camp on a suitable cell in a case in which the cell selection criterion S for enhanced coverage is fulfilled and the UE is in enhanced coverage.

5. A method of a User Equipment (UE), the method comprising:
receiving a first system information block comprising a first cell selection parameter for enhanced coverage and a second cell selection parameter for normal coverage;
receiving a second system information block comprising a first cell reselection parameter for enhanced coverage and a second cell reselection parameter for normal coverage,
wherein the second system information block is one of a system information block type 3 and a system information block type 5;
wherein the first cell selection parameter for enhanced coverage is specific to enhanced coverage and is applied to at least one of a first numerical formula defining a cell selection criterion S and a second numerical formula defining the cell selection criterion S, in a case in which the UE is in the enhanced coverage;
wherein the second cell selection parameter for normal coverage is applied to at least one of the first numerical formula defining the cell selection criterion S and the second numerical formula defining the cell selection criterion S, in a case in which the UE is in the normal coverage; and
wherein the first numerical formula derives a value Srxlev based on at least a measured cell received power level value $Q_{rxlevmeas}$, and a minimum required received power level value $Q_{rxlevmin}$, and the second numerical formula derives a value Squal based on at least a measured cell quality value $Q_{qualmeas}$, and a minimum required quality level value $Q_{qualmin}$.

6. The method according to claim 5, further comprising determining whether the UE is in the enhanced coverage based on a measured cell received power and a measured cell quality.

7. The method according to claim 5, further comprising considering that the UE is in the enhanced coverage based on the cell selection criterion S for enhanced coverage being fulfilled.

8. The method according to claim 5, further comprising camping on a suitable cell in a case in which the cell selection criterion S for enhanced coverage is fulfilled and the UE is in the enhanced coverage.

9. A base station comprising:
a memory; and
at least one hardware processor coupled to the memory, wherein the at least one hardware processor is configured to:
transmit, to a User Equipment (UE), a first system information block comprising a first cell selection parameter for enhanced coverage and a second cell selection parameter for normal coverage; and
transmit, to the UE, a second system information block comprising a first cell reselection parameter for enhanced coverage and a second cell reselection parameter for normal coverage, wherein the second system information block is one of a system information block type 3 and a system information block type 5;
wherein the first cell selection parameter for enhanced coverage is specific to enhanced coverage, and is applied to at least one of a first numerical formula defining a cell selection criterion S and a second numerical formula defining the cell selection criterion S, in a case in which the UE is in the enhanced coverage;
wherein the second cell selection parameter for normal coverage is applied to at least one of the first numerical formula defining the cell selection criterion S and the second numerical formula defining the cell selection criterion S, in a case in which the UE is in the normal coverage; and
wherein the first numerical formula derives a value Srxlev based on at least a measured cell received power level value $Q_{rxlevmeas}$, and a minimum required received power level value $Q_{rxlevmin}$, and the second numerical formula derives a value Squal based on at least a measured cell quality value $Q_{qualmeas}$, and a minimum required quality level value $Q_{qualmin}$.

10. A method of a base station, the method comprising:
transmitting, to a User Equipment (UE), a first system information block comprising a first cell selection parameter for enhanced coverage and a second cell selection parameter for normal coverage; and
transmitting, to the UE, a second system information block comprising a first cell reselection parameter for enhanced coverage and a second cell reselection parameter for normal coverage, wherein the second system information block is one of a system information block type 3 and a system information block type 5;
wherein the first cell selection parameter for enhanced coverage is specific to enhanced coverage and is applied to at least one of a first numerical formula defining a cell selection criterion S and a second numerical formula defining the cell selection criterion S, in a case in which the UE is in the enhanced coverage;
wherein the second cell selection parameter for normal coverage is applied to at least one of the first numerical formula defining the cell selection criterion S and the second numerical formula defining the cell selection criterion S, in a case in which the UE is in the normal coverage, and wherein the first numerical formula derives a value Srxlev based on at least a measured cell received power level value $Q_{rxlevmeas}$, and a minimum required received power level value $Q_{rxlevmin}$, and the second numerical formula derives a value Squal based on at least a measured cell quality value $Q_{qualmeas}$, and a minimum required quality level value $Q_{qualmin}$.

* * * * *